United States Patent
Heidinger et al.

(10) Patent No.: US 11,729,555 B2
(45) Date of Patent: Aug. 15, 2023

(54) ADJUSTABLE MAGNETIC SPRING FOR ACTUATOR

(71) Applicant: Sound Solutions International Co., Ltd., Beijing (CN)

(72) Inventors: Franz Heidinger, Unterwaltersdorf (AT); Manuel Mefleh, Vienna (AT); Gustav Otto, Vienna (AT); Friedrich Reining, Vienna (AT); Michael Schoffmann, Baden (AT)

(73) Assignee: Sound Solutions International Co., Ltd., Beijing (CN)

( * ) Notice: Subject to any disclaimer, the term of this patent is extended or adjusted under 35 U.S.C. 154(b) by 19 days.

(21) Appl. No.: 17/569,391

(22) Filed: Jan. 5, 2022

(65) Prior Publication Data
US 2022/0232326 A1  Jul. 21, 2022

(30) Foreign Application Priority Data

Jan. 12, 2021  (AT) .................................. 50005/2021

(51) Int. Cl.
*H04R 9/02*   (2006.01)
*H04R 11/02*  (2006.01)
*H02K 33/16*  (2006.01)

(52) U.S. Cl.
CPC ............ *H04R 9/025* (2013.01); *H02K 33/16* (2013.01); *H04R 11/02* (2013.01)

(58) Field of Classification Search
CPC ......... H04R 9/025; H04R 9/027; H04R 11/02
See application file for complete search history.

(56) References Cited

U.S. PATENT DOCUMENTS 11,341,948 B2 *  5/2022  Otto ................... H02K 41/0356
2003/0127918 A1  7/2003  Fukunaga et al.
(Continued)

FOREIGN PATENT DOCUMENTS

JP    2013057872 A    3/2013
KR    100793682 B1    1/2008
(Continued)

*Primary Examiner* — Sunita Joshi
(74) *Attorney, Agent, or Firm* — Dykema Gossett PLLC

(57) ABSTRACT

An electrodynamic actuator (1a, 1b) is disclosed, which is designed to be connected to a plate like structure (2) and which comprises a coil arrangement (3a, 3b) with at least one voice coil (4a, 4b), a magnet system (5) with a movable magnetic circuit part (7, 7a . . . 7f) and a static magnetic circuit part (6a . . . 6F) and a spring arrangement (12) coupling the static magnetic circuit part (6a . . . 6F) to the movable magnetic circuit part (7, 7a . . . 7f) and allowing a relative movement between the same. Both the spring arrangement (12) and the magnet system (5) provide a total restoring force ($F_T$) directed towards an idle position ($P_0$) of the movable magnetic circuit part (7, 7a . . . 7f). A part of a total restoring force gradient ($\Delta F_T/\Delta z$) caused by the magnet system (5) is at least 10% of the total restoring force gradient ($\Delta F_T/\Delta z$) in said idle position ($P_0$) of the movable magnetic circuit part (7, 7a . . . 7f). In addition, an output device (17) with the electromagnetic actuator (1a, 1b) mounted to a plate like structure (2) is disclosed.

24 Claims, 18 Drawing Sheets

(56) References Cited

U.S. PATENT DOCUMENTS

2013/0342034 A1 12/2013 Moon et al.
2016/0227326 A1 8/2016 Mao et al.

FOREIGN PATENT DOCUMENTS

| WO | 03044929 A1 | 5/2003 |
| WO | 2006001436 A1 | 1/2006 |
| WO | 2009133986 A1 | 11/2009 |

\* cited by examiner

ADJUSTABLE MAGNETIC SPRING FOR ACTUATOR

PRIORITY

This patent application claims priority from Austrian Patent Application No. A50005/2021, filed on Jan. 12, 2021, the disclosure of which is incorporated herein, in its entirety, by reference.

BACKGROUND

The invention relates to an electrodynamic actuator, which is designed to be connected to a backside of a plate like structure opposite to a sound emanating surface of the plate like structure. The electrodynamic actuator comprises a coil arrangement, a magnet system and a spring arrangement. The coil arrangement comprises at least one voice coil, which has an electrical conductor in the shape of loops running around a coil axis in a loop section. The magnet system has a static magnetic circuit part, which is arranged in fixed relation to the coil arrangement, and a movable magnetic circuit part. The spring arrangement couples the static magnetic circuit part to the movable magnetic circuit part and allows a relative movement between the static magnetic circuit part and said movable magnetic circuit part in an excursion direction parallel to the coil axis. The magnet system generally is designed to generate a magnetic field transverse to the conductor in the loop section. Both the spring arrangement and the magnet system provide a total restoring force directed towards an idle position of the movable magnetic circuit part, which idle position is defined as the position of the movable magnetic circuit part when no current flows through the at least one voice coil. A ratio between a differential total restoring force and a differential excursion of the movable magnetic circuit part is defined as a total restoring force gradient. Further on, the invention relates to an output device, which comprises a plate like structure with a sound emanating surface and a backside opposite to the sound emanating surface and an electromagnetic actuator of the above kind connected to said backside.

A drawback of known solutions is that because of common designs, the total restoring force and in particular its course over the excursion of the movable magnetic circuit part is basically defined by the spring arrangement. However, the possibilities for influencing the total restoring force by a particular design of the spring arrangement are limited. In particular, it is getting hard to find suitable shapes and materials for the spring arrangement which allow for the ever increasing output powers of said output devices while at the same time guaranteeing an expected sound quality and an expected lifetime for those devices.

SUMMARY OF THE INVENTION

Thus, it is an object of the invention to overcome the above drawbacks and to provide a better electromagnetic actuator and a better output device. In particular, a solution shall be provided, which allows to influence the total restoring force in a way that especially improves the combination of output power, sound quality and lifetime for those devices in comparison to prior art devices.

The inventive problem is solved by an electromagnetic actuator as defined in the opening paragraph, wherein a part of the total restoring force gradient caused by the magnet system is at least 10% of the total restoring force gradient in said idle position of the movable magnetic circuit part.

Furthermore, the inventive problem is solved by an output device, which comprises a plate like structure with a sound emanating surface and a backside opposite to the sound emanating surface and an electromagnetic actuator of the above kind connected to said backside.

By the proposed measures, the total restoring force is substantially influenced by the magnet system. Accordingly, the limitations of the spring arrangement can be overcome or can be compensated. In total, the proposed solution offers more design freedom in terms of reaching a desired output power, a desired sound quality and a desired lifetime of an electromagnetic actuator and an output device. Further preferred shares are 30% or even 50% of the total restoring force gradient.

In particular, the plate like structure can be embodied as a display, wherein the electromagnetic actuator is connected to the backside of the display (in particular by means of a mounting surface of the at least one voice coil or the magnet system). If the electromagnetic transducer is connected to the backside of the display, the output device can output both audio and video data.

Generally, a device, which the electromagnetic actuator is built into, may be any device with a display which additionally shall output sound. In particular, the invention relates to mobile devices like mobile phones and so on.

It should be noted that sound can also emanate from the backside of the plate like structure. However, this backside usually faces an interior space of a device (e.g. a mobile phone), which the output device is built into. Hence, the plate like structure may be considered to have the main sound emanating surface and a secondary sound emanating surface (i.e. said backside). Sound waves emanated by the main sound emanating surface directly reach the user's ear, whereas sound waves emanated by the a secondary sound emanating surface do not directly reach the user's ear, but only indirectly via reflection or excitation of other surfaces of a housing the device, which the output device is built into.

To obtain a long life connection between the electromagnetic actuator and the plate like, sound emanating structure, the at least one voice coil or the magnet system can comprise a flat mounting surface, which is intended to be connected to the backside the plate like structure, wherein said backside is oriented perpendicularly to the coil axis.

It should also be noted that a conductor of the voice coil is not limited to a particular shape, but can have a circular cross section as well as flat conductive structures like metal foils, which are interconnected to form a voice coil or a coil arrangement.

Moreover, one should note that the term "magnetic circuit part" does not imply that this part indeed comprises or consists of a magnet. Instead, this part can comprise or can consist of a ferrous material without generating a magnetic field. However, to generate a magnetic field, a magnet is arranged either in the static magnetic circuit part or in the movable magnetic circuit part or in both.

Further details and advantages of the electromagnetic actuator of the disclosed kind will become apparent in the following description and the accompanying drawings.

Beneficially, the total restoring force gradient caused by the magnet system is at least 10% of the total restoring force gradient in the maximum excursion position of the movable magnetic circuit part. Accordingly, the magnet system does not only have a substantial influence on the total restoring force in the idle position of the movable magnetic circuit part, but also in its maximum excursion position. The maximum excursion position of the movable magnetic circuit part is the excursion, which occurs when the nominal current of the electrodynamic actuator or the output device flows through the voice coils. Further preferred shares are 30% or even 50% of the total restoring force gradient.

Advantageously, the part of the total restoring force gradient caused by the magnet system in said idle position of the movable magnetic circuit part is smaller than in a position of the movable magnetic circuit part displaced from said idle position. That means that the total restoring force caused by the magnet system has a progressive course in a force excursion diagram. The more the course of the total restoring force is transformed towards the progressive side, the more the resonant frequency of the electrodynamic actuator is raised. This does also mean that the acoustic characteristics of the electrodynamic actuator and the output device can be influenced by designing the magnet system accordingly. Generally, it should be noted that the resonant frequency of the electrodynamic actuator is not only based on the restoring force resulting from the magnet system, but is based on the total restoring force. However, because the total restoring force is the sum of the part resulting from the spring arrangement plus the part resulting from the magnet system, the magnet system has a direct influence on the acoustic characteristics of the electrodynamic actuator and the output device. "More progressive" does not mandatorily mean that the course of the total restoring force is progressive. Instead, the course of the total restoring force can be linear or even degressive depending on the influence of the spring arrangement. But in any case, a progressive course of the restoring force caused by the magnet system brings the total restoring force more to the progressive side (even if the course of the total restoring force is less degressive). In summary, an unfavorable course of the restoring force caused by the spring arrangement can be compensated by a favorable course of the restoring force caused by the magnet system so as to improve the course of the total restoring force.

It is also advantageous, if the part of the total restoring force gradient caused by the magnet system in said idle position of the movable magnetic circuit part is higher than in a position of the movable magnetic circuit part displaced from said idle position. That means that the total restoring force caused by the magnet system has a degressive course in a force excursion diagram. The technical disclosure presented above with respect to the progressive course equally applies to the degressive course, but with an opposite sign what in particular means that the resonant frequency of the electrodynamic actuator and the output device can be lowered by a degressive course of the restoring force. Especially, this is of interest when the lower frequencies of relatively small electrodynamic actuators and output devices shall be improved so as to improve the sound quality felt by the user.

Beneficially, a width of an airgap between the static magnetic circuit part and the movable magnetic circuit part in a cross sectional plane comprising the coil axis measured in a direction perpendicular to said coil axis can be constant along a direction parallel to said coil axis. Accordingly, the movable magnetic circuit part is easy to manufacture.

It is also beneficial, if a width of an airgap between the static magnetic circuit part and the movable magnetic circuit part in a cross sectional plane comprising the coil axis measured in a direction perpendicular to said coil axis changes or varies along a direction parallel to said coil axis. In this way, the course of the restoring force caused by the magnet system can be influenced substantially.

For example, it is of advantage if a profile contour of an airgap between the static magnetic circuit part and the movable magnetic circuit part in a cross sectional plane comprising the coil axis changes stepwise in a direction parallel to said coil axis. For example, the static magnetic circuit part or the movable magnetic circuit part may comprise grooves or ridges with a rectangular cross section, square cross section, triangular cross section or trapezoid cross section. For example, the static magnetic circuit part or the movable magnetic circuit part may also comprise through holes or blind holes and may comprise circular holes or slot holes for this reason.

Advantageously, a profile contour of an airgap between the static magnetic circuit part and the movable magnetic circuit part in a cross sectional plane comprising the coil axis can also change continuously in a direction parallel to said coil axis. So, the static magnetic circuit part or the movable magnetic circuit part can have curved surfaces in the region of the airgap, which may be concave or convex. By these measures, a very smooth course of the restoring force caused by the magnet system can be obtained.

Generally, a profile contour of an airgap between the static magnetic circuit part and the movable magnetic circuit part in a cross sectional plane comprising the coil axis can be symmetric or asymmetric with respect to an axis perpendicular to the coil axis at the idle position of the movable magnetic circuit part. Symmetric profiles are easy to produce, whereas asymmetric profiles can provide more sophisticated courses of the total restoring force.

Generally, an airgap, which opens upon a movement of the movable magnetic circuit part out of its idle position, leads to a progressive course of a total restoring force caused by the magnet system in a force excursion diagram and hence to a higher resonant frequency of the electrodynamic actuator and the output device. In contrast, an airgap, which closes upon a movement of the movable magnetic circuit part out of its idle position, leads to a degressive course of a total restoring force caused by the magnet system in a force excursion diagram and hence to a reduction of the resonant frequency of the electrodynamic actuator and the output device.

An airgap, which opens upon a movement of the movable magnetic circuit part out of its idle position, can be obtained by a ridge in a region of high magnetic flux, whereas an airgap, which closes upon a movement of the movable magnetic circuit part out of its idle position, can be obtained by a groove in a region of high magnetic flux.

Beneficially, a profile contour of an airgap between the static magnetic circuit part and the movable magnetic circuit part in cross sectional planes comprising the coil axis can stay the same along an annular course of the airgap around the coil axis. Hence, the magnet system is easy to manufacture.

But it is also of advantage, if a profile contour of an airgap between the static magnetic circuit part and the movable magnetic circuit part in cross sectional planes comprising the coil axis changes or varies along an annular course of the airgap around the coil axis. This is another way to influence the course of the restoring force of the magnet system. However, care should taken that this change or variation of the contour of the airgap does not cause undesired rocking of the movable magnetic circuit part. Accordingly, the course of the airgap around the coil axis preferably shall be symmetric with regards to axes around which the movable magnetic circuit part could rock. It should also be noted that said change or variation of the contour of the airgap could be used to compensate or reduce a rocking tendency, which is caused by asymmetries of the electrodynamic actuator.

In yet another beneficial embodiment of the electrodynamic actuator, a width of the at least one voice coil in a cross sectional plane comprising the coil axis measured in a direction perpendicular to said coil axis is constant along a direction parallel to said coil axis. Accordingly, the voice coil is easy to manufacture. In particular, this embodiment fits to electrodynamic actuators where also the width of an airgap between the static magnetic circuit part and the movable magnetic circuit part is constant in such a cross sectional plane and along such a direction.

It is also beneficial, if a width of the at least one voice coil in a cross sectional plane comprising the coil axis measured in a direction perpendicular to said coil axis changes or varies along a direction parallel to said coil axis. In this way, the driving force and its course over the excursion can be controlled or influenced. In particular, this embodiment fits to electrodynamic actuators where also the width of an airgap between the static magnetic circuit part and the movable magnetic circuit part changes or varies in such a cross sectional plane and along such a direction.

Moreover, it is beneficial if a profile contour of the at least one voice coil in a cross sectional plane comprising the coil axis changes stepwise in a direction parallel to said coil axis. Those voice coils are comparably easy to produce. In particular, this embodiment fits to electrodynamic actuators where also the width of an airgap between the static magnetic circuit part and the movable magnetic circuit part changes stepwise in such a cross sectional plane and along such a direction.

In addition, it is of advantage if a profile contour of the at least one voice coil in a cross sectional plane comprising the coil axis changes continuously in a direction parallel to said coil axis. So, the voice coil can have curved surfaces in the region of the airgap, which may be concave or convex. By these measures, a very smooth course of the driving force can be obtained. This embodiment particularly fits to electrodynamic actuators where also the width of an airgap between the static magnetic circuit part and the movable magnetic circuit part changes continuously in such a cross sectional plane and along such a direction.

It is advantageous if the magnet system comprises a center magnet, a bottom plate arranged adjacent to said center magnet, a top plate arranged adjacent to said center magnet and opposite of the bottom plate and an outer plate arrangement surrounding the top plate, wherein an airgap between the top plate and the outer plate arrangement is larger than besides thereof. In other words, an airgap between the top plate and the outer plate arrangement closes upon a movement of the movable magnetic circuit part out of its idle position. The outer plate arrangement can comprise one outer plate or more outer plates. In addition, the outer plate arrangement can surround the bottom plate, too, wherein an airgap between the bottom plate and the outer plate arrangement is larger than besides thereof. In other words, an airgap between the bottom plate and the outer plate arrangement closes upon a movement of the movable magnetic circuit part out of its idle position. As mentioned above, an airgap, which closes upon a movement of the movable magnetic circuit part out of its idle position, leads to a degressive course of a total restoring force caused by the magnet system in a force excursion diagram and hence to a reduction of the resonant frequency of the electrodynamic actuator and the output device.

In particular, a behavior of the above kind can be achieved by means of a groove facing the top plate. So, beneficially the magnet system can comprise a center magnet, a bottom plate arranged adjacent to said center magnet, a top plate arranged adjacent to said center magnet and opposite of the bottom plate and an outer plate arrangement surrounding the top plate, wherein the outer plate arrangement comprises a groove facing the top plate. The outer plate arrangement can comprise one outer plate or more outer plates. The outer plate arrangement can surround the bottom plate, too, and can comprise a groove facing the bottom plate. By the above measures, the grooves are arranged in a region of high magnetic flux. In particular, the grooves can have a rectangular cross section, square cross section, triangular cross section or trapezoid cross section or can also have a round shape like a semi-circle.

The above behavior can also be achieved by means of holes facing the top plate. So, beneficially the magnet system can comprise a center magnet, a bottom plate arranged adjacent to said center magnet, a top plate arranged adjacent to said center magnet and opposite of the bottom plate and an outer plate arrangement surrounding the top plate, wherein the outer plate arrangement comprises holes facing the top plate. The outer plate arrangement can comprise one outer plate or more outer plates. The outer plate arrangement can surround the bottom plate, too, and can comprise holes facing the bottom plate. By the above measures, the holes are arranged in a region of high magnetic flux. In particular, the holes may be through holes or blind holes and may be circular holes or slot holes. The holes, which are arranged in the outer plate arrangement may also vary in size, i.e. may have different diameter or length.

Furthermore, it is advantageous if the magnet system comprises a center magnet, a bottom plate arranged adjacent to said center magnet, a top plate arranged adjacent to said center magnet and opposite of the bottom plate and an outer plate arrangement surrounding the top plate, wherein an airgap between the top plate and the outer plate arrangement is smaller than besides thereof. In other words, an airgap between the top plate and the outer plate arrangement opens upon a movement of the movable magnetic circuit part out of its idle position. The outer plate arrangement can comprise one outer plate or more outer plates. In addition, the outer plate arrangement can surround the bottom plate, too, wherein an airgap between the bottom plate and the outer plate arrangement is smaller than besides thereof. In other words, an airgap between the bottom plate and the outer plate arrangement opens upon a movement of the movable magnetic circuit part out of its idle position. As mentioned above, an airgap, which opens upon a movement of the movable magnetic circuit part out of its idle position, leads to a progressive course of a total restoring force caused by the magnet system in a force excursion diagram and hence to a higher resonant frequency of the electrodynamic actuator and the output device.

In particular, a behavior of the above kind can be achieved by means of a ridge facing the top plate. So, beneficially the magnet system can comprise a center magnet, a bottom plate arranged adjacent to said center magnet, a top plate arranged adjacent to said center magnet and opposite of the bottom plate and an outer plate arrangement surrounding the top plate, wherein the outer plate arrangement comprises a ridge facing the top plate. The outer plate arrangement can comprise one outer plate or more outer plates. The outer plate arrangement can surround the bottom plate, too, and can comprise a ridge facing the bottom plate. By the above measures, the ridges are arranged in a region of high magnetic flux. In particular, the ridges can have a rectangular cross section, square cross section, triangular cross section or trapezoid cross section or can also have a round shape like a semi-circle.

In particular, the bottom plate, the top plate and the outer plate arrangement of the aforementioned embodiments can be made of a ferrous material, whereas only the center magnet actually generates the magnetic field.

Beneficially, an average sound pressure level of the output device measured in an orthogonal distance of 10 cm from the sound emanating surface is at least 50 dB in a frequency range from 100 Hz to 15 kHz. "Average sound pressure level SPLAVG" in general means the integral of the sound pressure level SPL over a particular frequency range divided by said frequency range. In the above context, in detail the ratio between the sound pressure level SPL integrated over a frequency range from f=100 Hz to f=15 kHz and the frequency range from f=100 Hz to f=15 kHz is meant. In a more mathematical language this means $$SPL_{AVG} = \frac{\int_{f=100}^{f=15000} SPL \cdot df}{15000 - 100}$$

BRIEF DESCRIPTION OF THE DRAWINGS

These and other aspects, features, details, utilities, and advantages of the invention will become more fully apparent from the following detailed description, appended claims, and accompanying drawings, wherein the drawings illustrate features in accordance with exemplary embodiments of the invention, and wherein:

FIG. 25 shows a cross sectional view of the electrodynamic actuator of FIG. 24a;

Like reference numbers refer to like or equivalent parts in the several views.

DETAILED DESCRIPTION OF EMBODIMENTS

Figure 1:
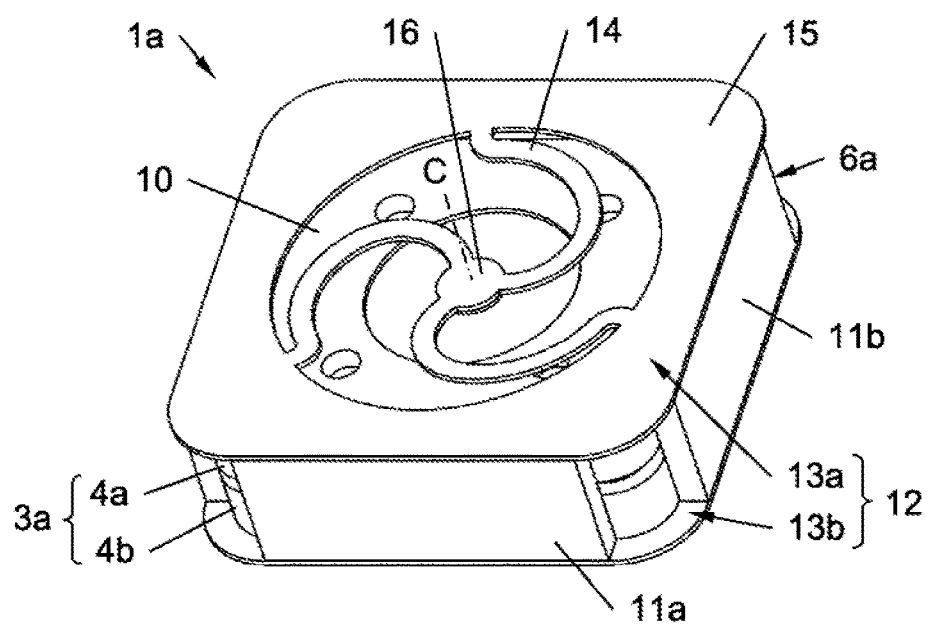
FIG. 1 shows an oblique view of a first example of an electrodynamic actuator with an airgap of constant width.

Various embodiments are described herein to various apparatuses. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment," or the like, means that a particular feature, structure, or characteristic described in connection with the embodiment is included in at least one embodiment. Thus, appearances of the phrases "in various embodiments," "in some embodiments," "in one embodiment," or "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms "a," "an" and "the" include plural referents unless the content clearly dictates otherwise.

The terms "first," "second," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

All directional references (e.g., "plus," "minus," "upper," "lower," "upward," "down-ward," "left," "right," "leftward," "rightward," "front," "rear," "top," "bottom," "over," "under," "above," "below," "vertical," "horizontal," "clockwise," and "counterclockwise") are only used for identification purposes to aid the reader's understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached," "coupled," "connected," and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

All numbers expressing measurements and so forth used in the specification and claims are to be understood as being modified in all instances by the term "about" or "substantially," which particularly means a deviation of ±10% from a reference value.

Figure 2:
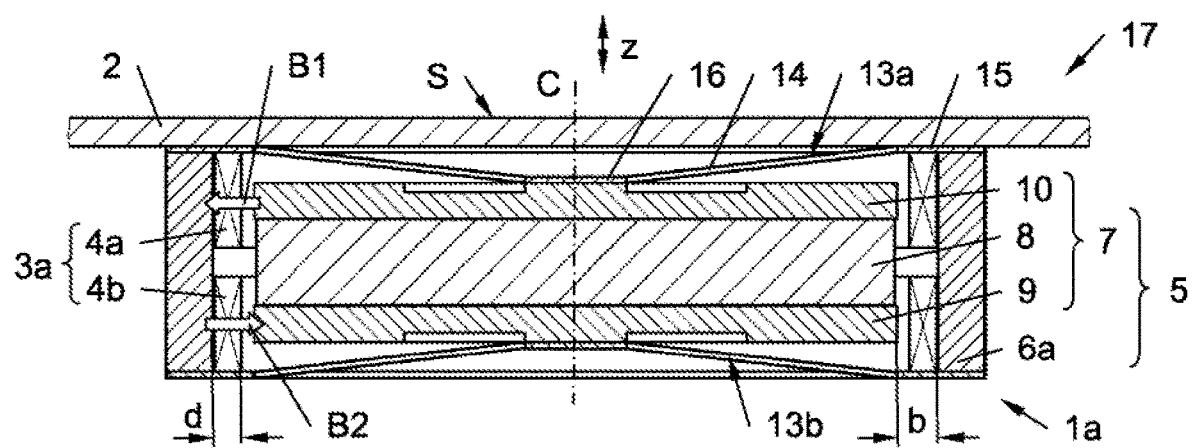
FIG. 2 shows a cross sectional view of the electrodynamic actuator of FIG. 1.

FIGS. 1 and 2 show a first example of an electrodynamic actuator 1a, which is designed to be connected to a backside of a plate like structure 2. In detail, FIG. 1 shows an oblique view of the electrodynamic actuator 1a without the plate like structure 2, and FIG. 2 shows a cross sectional view of the electrodynamic actuator 1a, which is connected to a backside of the plate like structure 2 opposite to a sound emanating surface S of the plate like structure 2.

The electrodynamic actuator 1a comprises a coil arrangement 3a with two voice coils 4a, 4b, which have electrical conductors in the shape of loops running around a coil axis C in a loop section. In addition, the electrodynamic actuator 1a comprises a magnet system 5 with a static magnetic circuit part 6a, which is arranged in fixed relation to the coil arrangement 3a, and a movable magnetic circuit part 7, which is movable in relation to the static magnetic circuit part 6a and the coil arrangement 3a. The magnet system 5 is designed to generate a magnetic field B1, B2 transverse to the conductors of the voice coils 4a, 4b in the loop section and in this example comprises a center magnet 8, a bottom plate 9 and a top plate 10. The bottom plate 9 is arranged adjacent to said center magnet 8, and the top plate 10 is arranged adjacent to said center magnet 8 and opposite of the bottom plate 9. The static magnetic circuit part 6a is formed by an outer plate arrangement, which surrounds the movable magnetic circuit part 7 and which in this example comprises four separate outer plates 11a . . . 11d.

Further on, the electrodynamic actuator 1a comprises a spring arrangement 12, which couples the static magnetic circuit part 6a to the movable magnetic circuit part 7 and allows a relative movement between the static magnetic circuit part 6a and said movable magnetic circuit part 7 in an excursion direction z parallel to the coil axis C. In this example, the spring arrangement 12 comprises two springs 13a, 13b, each having spring legs 14, an (annular) outer holder 15 and a center holder 16. The outer holders 15 of the two springs 13a, 13b are connected to the outer plate arrangement 6a (static magnetic circuit part). The center holder 16 of the first spring 13a is connected to the top plate 10, which belongs to the movable magnetic circuit part 7, and the center holder 16 of the second spring 13b is connected to the bottom plate 9, which belongs to the movable magnetic circuit part 7 as well. The spring legs 14 each connect the outer holder 15 and the center holder 16 and allow a relative movement between the same and thus also between the static magnetic circuit part 6a and the movable magnetic circuit part 7.

The electrodynamic actuator 1a together with the plate like structure 2 forms an output device 17. In particular, the plate like structure 2 may be embodied as a display. In this case, the output device 17 can output both audio and video data.

Beneficially, an average sound pressure level of the output device 17 measured in an orthogonal distance of 10 cm from the sound emanating surface S is at least 50 dB_SPL in a frequency range from 100 Hz to 15 kHz.

To obtain a long life connection between the electromagnetic actuator 1a and the plate like structure 2, the at least one voice coil 4a, 4b or the magnet system 5 (here its static magnetic circuit part 6a) can comprise a flat mounting surface, which is intended to be connected to the backside the plate like structure 2 opposite to the sound emanating surface S.

With regards to the sound emanating surface S, one should note that sound can also emanate from the backside of the plate like structure 2, i.e. the plate side opposite of the sound emanating surface S. However, this backside usually faces an interior space of a device (e.g. a mobile phone), which the output device 2 is built into. Hence, the plate like 2 structure may be considered to have the main sound emanating surface S and a secondary sound emanating surface (i.e. said backside). Sound waves emanated by the main sound emanating surface S directly reach the user's ear, whereas sound waves emanated by the a secondary sound emanating surface do not directly reach the user's ear, but only indirectly via reflection or excitation of other surfaces of a housing the device, which the output device 2 is built into.

Figure 3:
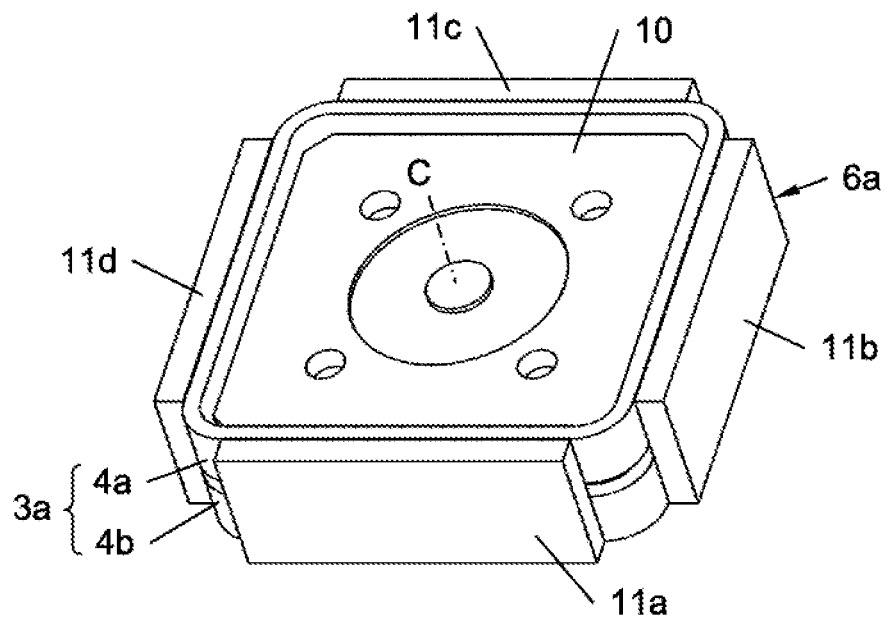
FIG. 3 shows an oblique view of the electrodynamic actuator of FIG. 1 with the springs being detached.

FIG. 3 in addition shows an oblique view of the electrodynamic actuator 1a with the springs 13a, 13b being detached so as to allow a better view into the interior of the electrodynamic actuator 1a.

Figure 4:
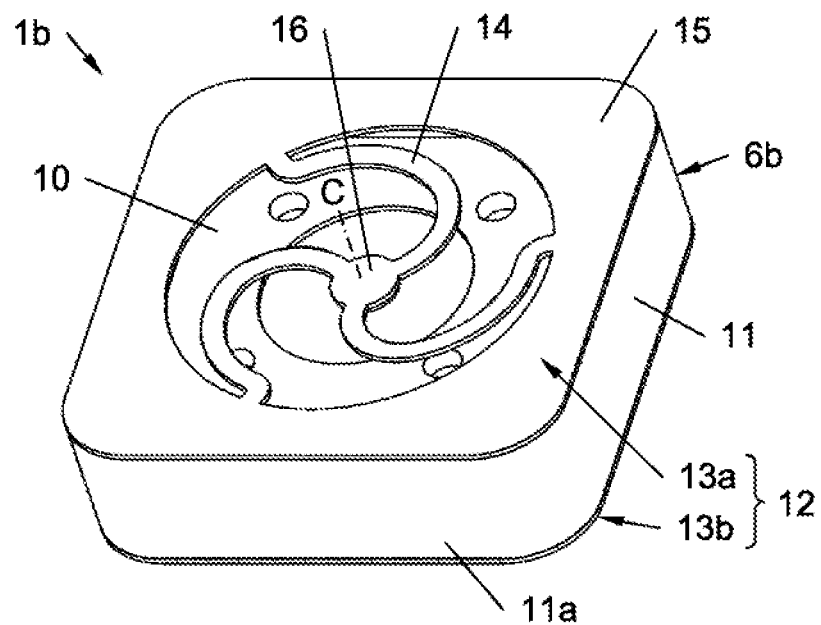
FIG. 4 shows an oblique view of an example of an electrodynamic actuator with an annular static magnetic circuit part.
Figure 5:
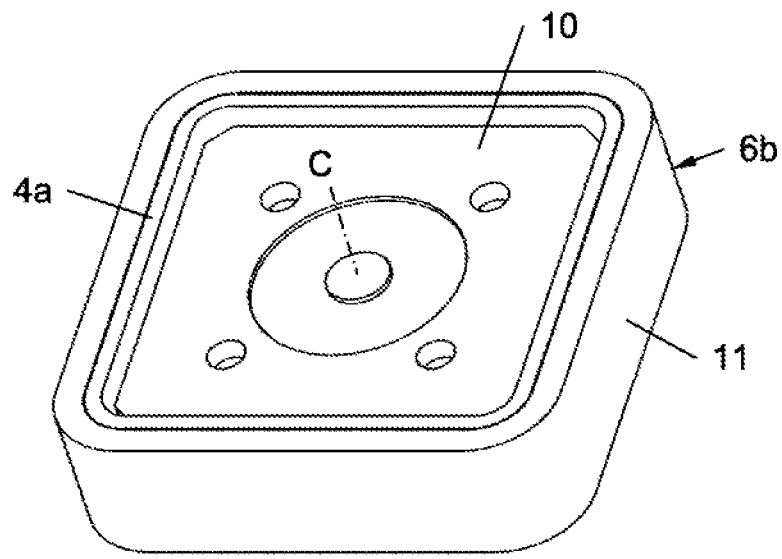
FIG. 5 shows an oblique view of the electrodynamic actuator of FIG. 4 with the springs being detached.

FIG. 4 shows an oblique view of a second example of an electrodynamic actuator 1b, which is similar to the electrodynamic actuator 1a shown in FIGS. 1 to 3. In contrast, the outer plate arrangement 6b is formed by a single annular outer plate 11. Nevertheless, the cross sectional view of the electrodynamic actuator 1a applies to the electrodynamic actuator 1b as well. FIG. 5 in addition shows an oblique view of the interior part of the electrodynamic actuator 1b, which is the electrodynamic actuator 1b with the springs 13a, 13b being detached.

Figure 6:
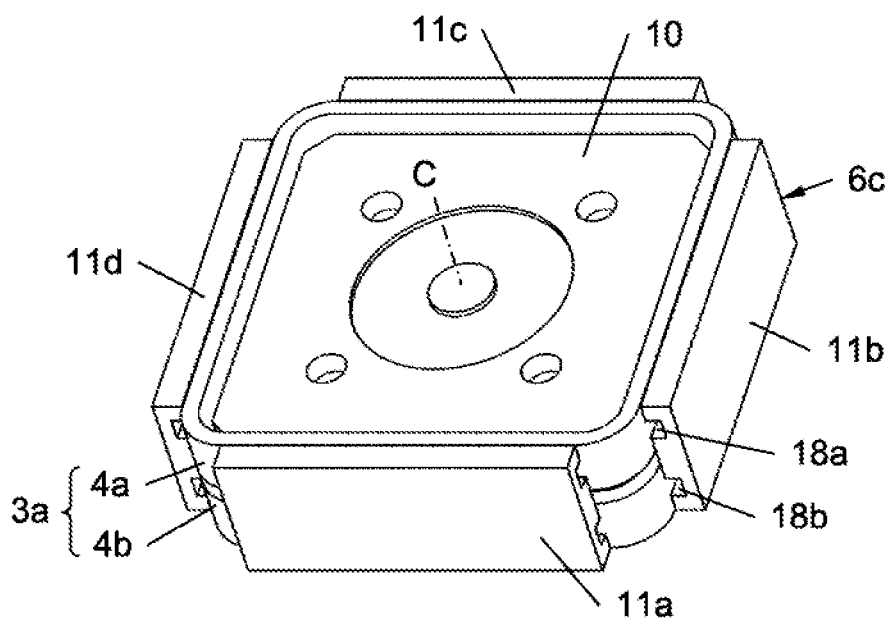
FIG. 6 shows an oblique view of an interior part of an electrodynamic actuator with grooves in the outer plate arrangement.

FIG. 6 shows an oblique view of an interior part of another electrodynamic actuator, which is similar to the interior part of the electrodynamic actuator 1a. In contrast, the outer plate arrangement 6c comprises grooves 18a, 18b, wherein the groove 18a faces the top plate 10 and the groove 18b faces the bottom plate 9. In addition, FIG. 7 shows a cross sectional view of the arrangement shown in FIG. 6 (note that the springs 13a, 13b are detached here, too, but the complete electrodynamic actuator of course comprises the same).

Figure 7:
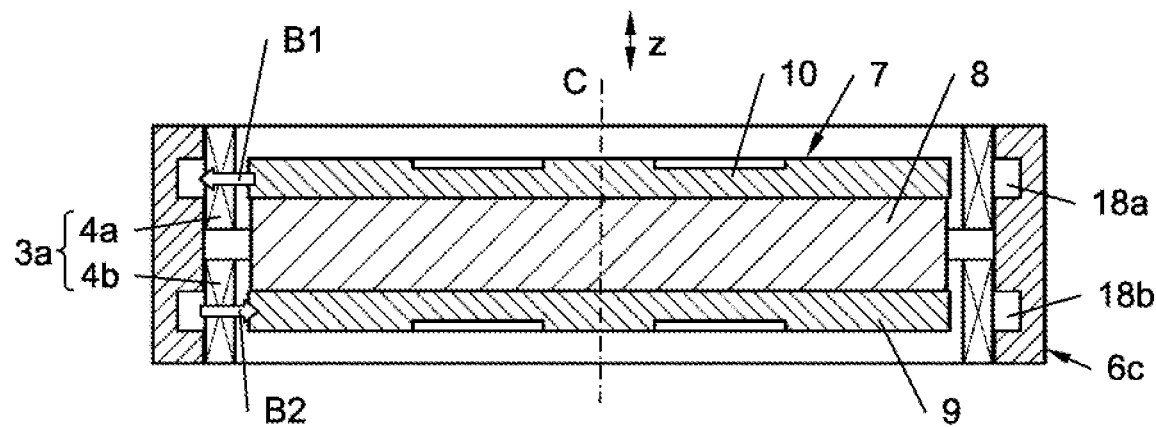
FIG. 7 shows a cross sectional view of the arrangement shown in FIG. 6.
Figure 8:
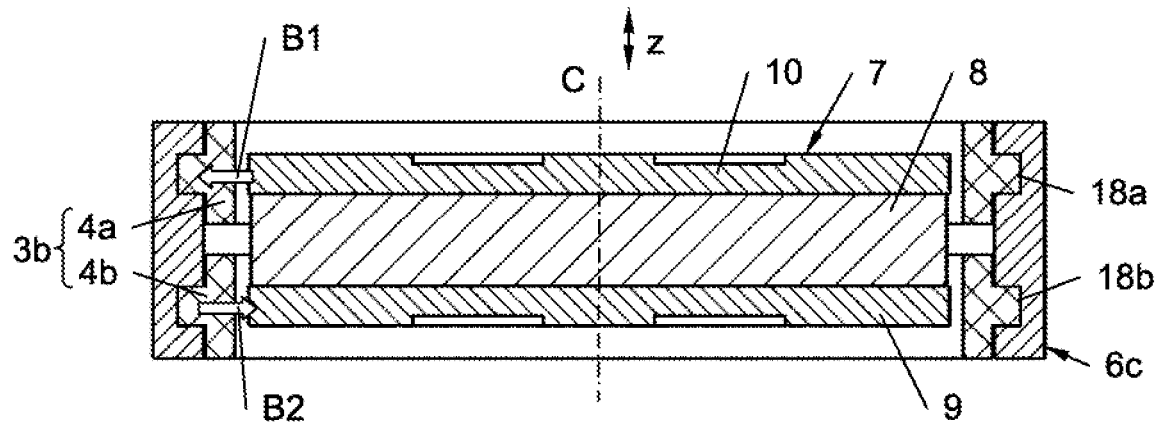
FIG. 8 shows a cross sectional view of an interior part of an electrodynamic actuator with voice coils reaching into the grooves in the outer plate arrangement.

FIG. 8 shows a cross sectional view of an alternative embodiment, which is similar to that shown in FIGS. 6 and 7. In contrast, the voice coils 3a, 3b forming the coil arrangement 3b are shaped differently. In detail, the voice coils 3a, 3b reach into the grooves 18a, 18b.

Figure 9:
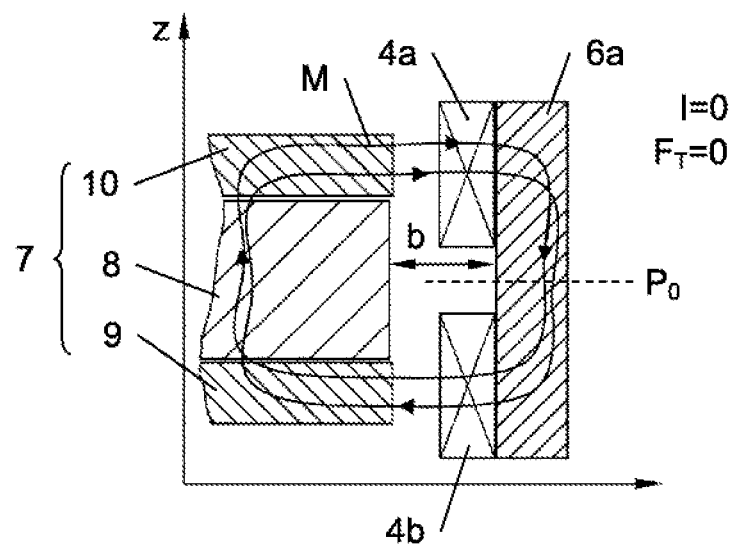
FIG. 9 shows a detailed cross sectional view of the electrodynamic actuator similar to that of FIG. 1 in the idle position of the movable magnetic circuit part.
Figure 10:
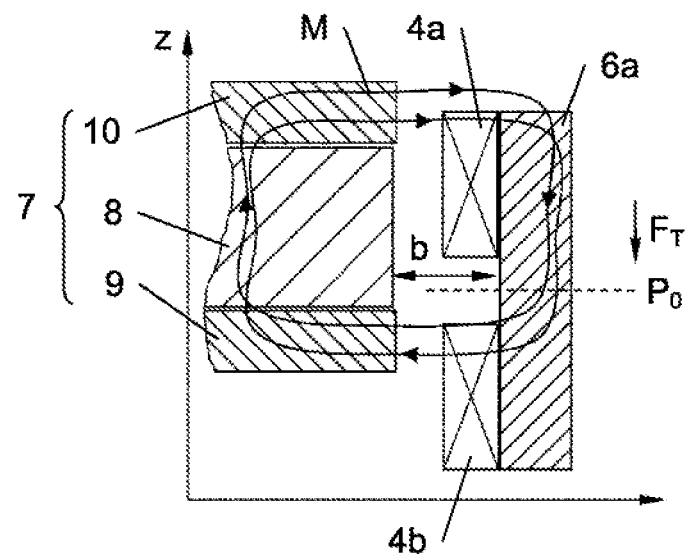
FIG. 10 shows a detailed cross sectional view of the electrodynamic actuator of FIG. 9 in the excursed position of the movable magnetic circuit part.

FIGS. 9 and 10 show a detailed cross sectional view of an electrodynamic actuator, which is similar to the electrodynamic actuator 1a shown in FIGS. 1 to 3, in different states, that is at different positions of the movable magnetic circuit part 7. In detail, FIG. 9 shows the movable magnetic circuit part 7 in its idle position $P_0$ when no current I flows through the voice coils 4a, 4b, and FIG. 10 shows the movable magnetic circuit part 7 in an excursed position, i.e. displaced from its idle position $P_0$ in the z-direction or excursion direction. FIGS. 9 and 10 also show how the magnetic flux M runs.

Both the spring arrangement 12 and the magnet system 5 provide a total restoring force $F_T$ directed towards the idle position $P_0$ of the movable magnetic circuit part 7, when the movable magnetic circuit part 7 is excursed. Accordingly, the total restoring force $F_T$ is zero in the state shown in FIG. 9.

In the example shown in FIGS. 9 and 10, a width b of an airgap between the static magnetic circuit part 6a and the movable magnetic circuit part 7 in a cross sectional plane comprising the coil axis C measured in a direction perpendicular to said coil axis C is constant along a direction parallel to said coil axis C. Hence, the magnet system 5 is easy to manufacture.

Figure 11:
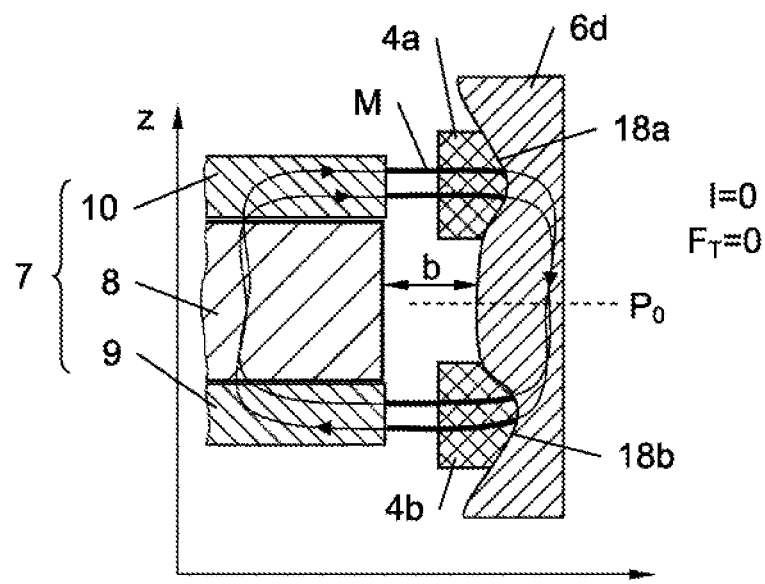
FIG. 11 shows a detailed cross sectional view of an electrodynamic actuator with a grooved outer plate arrangement in the idle position of the movable magnetic circuit part.
Figure 12:
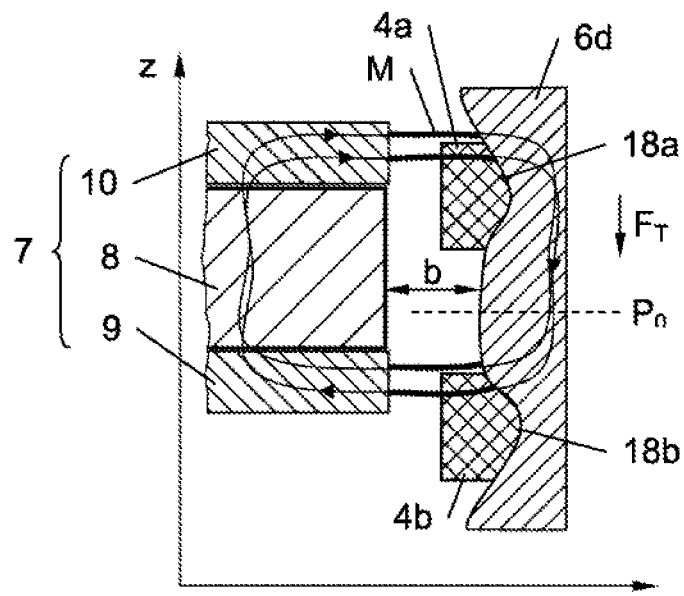
FIG. 12 shows the electrodynamic actuator of FIG. 11 in the excursed position of the movable magnetic circuit part.

However, this is not the only possibility. FIGS. 11 and 12 show a detailed cross sectional view of an alternative electrodynamic actuator, which is similar to that of FIGS. 9 and 10, in different states equivalent to the states of shown in FIGS. 9 and 10. In contrast, the static magnetic circuit part 6d comprises grooves 18a, 18b, wherein the groove 18a faces the top plate 10 and the groove 18b faces the bottom plate 9. Thus, the grooves 18a, 18b are arranged in a region of high magnetic flux M. The arrangement of the grooves 18a, 18b also means that the width b of the airgap between the static magnetic circuit part 6d and the movable magnetic circuit part 7 in a cross sectional plane comprising the coil axis C measured in a direction perpendicular to said coil axis C changes or varies along a direction parallel to said coil axis C. In detail, a profile contour of the airgap changes continuously in a direction parallel to said coil axis C. In more detail, the airgap between the top plate 10 and the static magnetic circuit part 6d and between the bottom plate 9 and the static magnetic circuit part 6d is larger than besides thereof. That means that said airgaps close upon a movement of the movable magnetic circuit part 7 out of its idle position $P_0$.

Generally, changing or varying the width b of the airgap is a possibility to substantially influence the course of the restoring force $F_T$. Moreover, a continuous change of a profile contour of the airgap generally leads to a very smooth course of the restoring force $F_T$.

Figure 13:
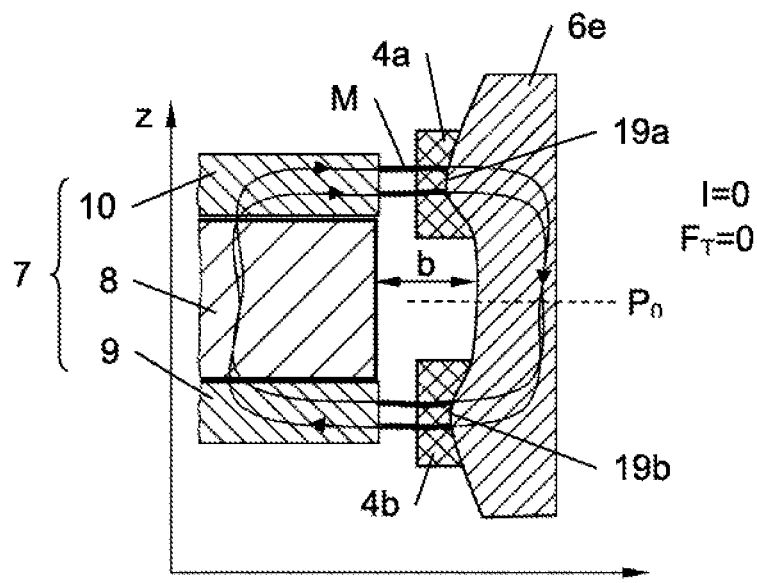
FIG. 13 shows a detailed cross sectional view of an electrodynamic actuator with a ridged outer plate arrangement in the idle position of the movable magnetic circuit part.
Figure 14:
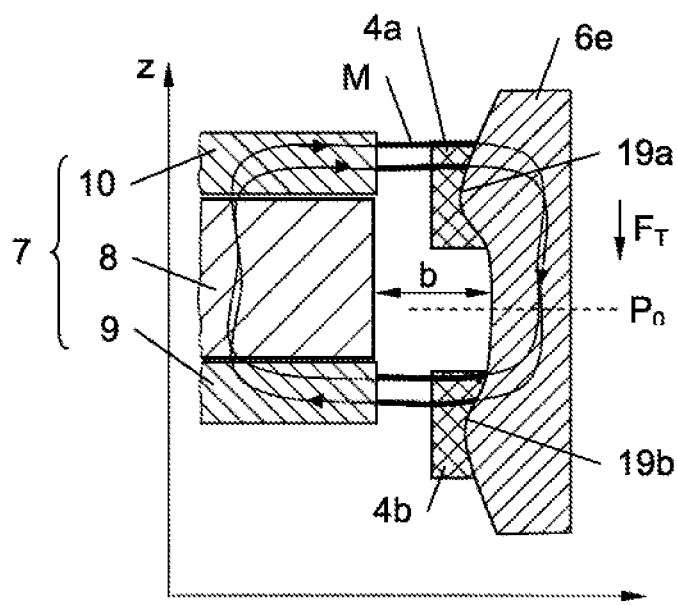
FIG. 14 shows the electrodynamic actuator of FIG. 13 in the excursed position of the movable magnetic circuit part.

In yet another embodiment, which is shown in FIGS. 13 and 14, the static magnetic circuit part 6e comprises ridges 19a, 19b, wherein the ridge 19a faces the top plate 10 and the ridge 19b faces the bottom plate 9. Thus, the ridges 19a, 19b are arranged in a region of high magnetic flux M. Again, the width b of the airgap changes or varies along a direction parallel to said coil axis C, and again a profile contour of the airgap changes continuously in a direction parallel to said coil axis C. In more detail, the airgap between the top plate 10 and the static magnetic circuit part 6d and between the bottom plate 9 and the static magnetic circuit part 6d is smaller than besides thereof. That means that said airgaps open upon a movement of the movable magnetic circuit part 7 out of its idle position $P_0$.

It should also be noted that a width d of the voice coils 4a, 4b in a cross sectional plane comprising the coil axis C measured in a direction perpendicular to said coil axis C can change or vary along a direction parallel to said coil axis C, too, as this is the case for the embodiments shown in FIGS. 11 to 14, whereas the width d is constant along a direction parallel to said coil axis C for the embodiment shown in FIGS. 9 and 10. In detail, a profile contour of the voice coils 4a, 4b in a cross sectional plane comprising the coil axis C changes continuously in a direction parallel to said coil axis C in the embodiments shown in FIGS. 11 to 14. However, the profile contour of the voice coils 4a, 4b in a cross sectional plane comprising the coil axis C may also change stepwise in a direction parallel to said coil axis C like this is already depicted in FIG. 8. The very same counts for the grooves 18a, 18b, which may change stepwise in a direction parallel to said coil axis C as well like this is already depicted in FIGS. 6 to 8.

Generally, voice coils 4a, 4b with constant width d are easy to manufacture. Changing or varying the width d of the voice coils 4a, 4b on the other hand is a possibility to control or influence the driving force and its course over the excursion z. If the profile contour of the at least one voice coil 4a, 4b changes stepwise, the voice coils 4a, 4b are still comparably easy to produce. On the other hand, a continuous change of the profile contour of the at least one voice coil 4a, 4b leads to a very smooth course of the driving force.

Figure 15:
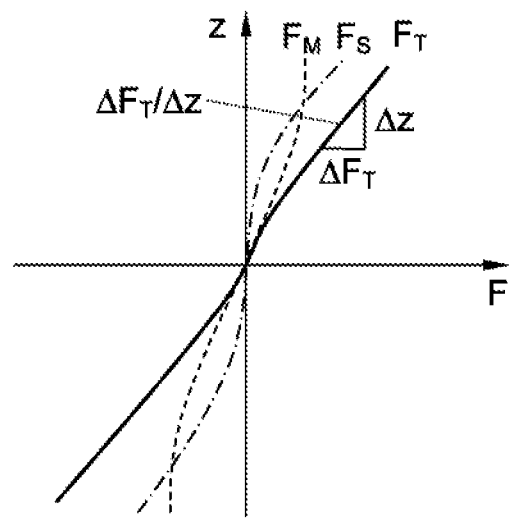
FIG. 15 shows a first exemplary diagram of the excursion over the force acting on the movable magnetic circuit part.

FIG. 15 now shows a first exemplary diagram of the excursion z over the force F acting on the movable magnetic circuit part 7. As mentioned hereinbefore, both the spring arrangement 12 and the magnet system 5 provide a total restoring force $F_T$ directed towards an idle position $P_0$ of the movable magnetic circuit part 7. FIG. 15 shows exemplary graphs for the total restoring force $F_T$ (shown by a continuous line), for the restoring force $F_S$ caused by spring arrangement 12 (shown by a dash dotted line) and for the restoring force $F_M$ caused by magnet system 5 (shown by a dashed line). In this example, the spring arrangement 12 causes a progressive restoring force $F_S$ and the magnet system 5 causes a degressive restoring force $F_M$. The restoring force $F_M$ caused by magnet system 5 nearly compensates the progressive graph of the restoring force $F_S$ caused by spring arrangement 12 so that the resulting total restoring force $F_T$ nearly shows a linear course. A ratio between a differential total restoring force $\Delta F_T$ and a differential excursion $\Delta z$ of the movable magnetic circuit part 7 generally is defined as a total restoring force gradient $\Delta F_T / \Delta z$.

When the magnet system 5 causes a degressive restoring force $F_M$, a part of the total restoring force gradient $\Delta F_T / \Delta z$ caused by the magnet system 5 in said idle position $P_0$ of the movable magnetic circuit part 7 is higher than in a position of the movable magnetic circuit part 7 displaced from said idle position $P_0$. In contrast, a part of the total restoring force gradient $\Delta F_T / \Delta z$ caused by the magnet system 5 in said idle position $P_0$ of the movable magnetic circuit part 7 is lower than in a position of the movable magnetic circuit part 7 displaced from said idle position $P_0$ if the magnet system 5 causes a progressive restoring force $F_M$.

Figure 16:
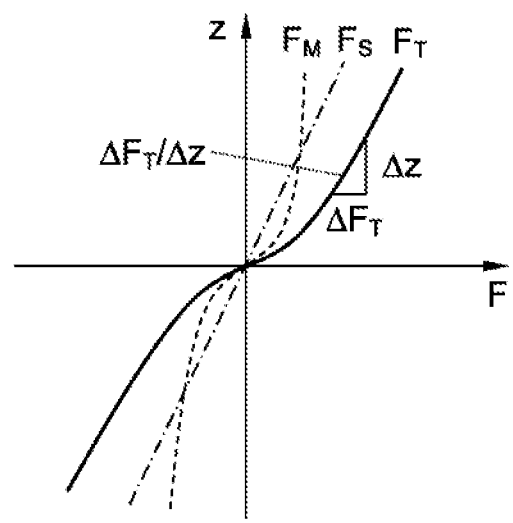
FIG. 16 shows a second exemplary diagram of the excursion over the force acting on the movable magnetic circuit part.

FIG. 16 shows a second exemplary diagram of the excursion z over the force F acting on the movable magnetic circuit part 7, which is similar to FIG. 15. In contrast, the restoring force $F_S$ caused by spring arrangement 12 basically is linear. Accordingly, the resulting total restoring force $F_T$ shows a degressive course, which however is not as pronounced as the degressive course of the restoring force $F_M$ caused by magnet system 5.

In general, an airgap, which closes upon a movement of the movable magnetic circuit part 7 out of its idle position $P_0$ or grooves 18a, 18b vis-a-vis of the bottom plate 9 and the top plate 10 lead to a degressive behavior of the restoring force $F_M$ caused by magnet system 5, and an airgap, which opens upon a movement of the movable magnetic circuit part 7 out of its idle position $P_0$ or ridges 19a, 19b vis-a-vis of the bottom plate 9 and the top plate 10 lead to a progressive behavior of the magnetic restoring force $F_M$.

Moreover, a degressive behavior of the total restoring force $F_T$ leads to a resonant frequency of the electrodynamic actuator 1a, 1b or the output device 17, which is lower than the resonant frequency of the electrodynamic actuator 1a, 1b or the output device 17 having a linear course of the total restoring force $F_T$. In turn, progressive behavior of the total restoring force $F_T$ leads to a resonant frequency of the electrodynamic actuator 1a, 1b or the output device 17, which is higher than the resonant frequency of the electrodynamic actuator 1a, 1b or the output device 17 having a linear course of the total restoring force $F_T$.

Accordingly, the magnet system 5 can be used to influence the resonant frequency of the electrodynamic actuator 1a, 1b or the output device 17. An airgap, which closes upon a movement of the movable magnetic circuit part 7 out of its idle position $P_0$, or grooves 18a, 18b vis-a-vis of the bottom plate 9 and the top plate 10 can be used to lower the resonant frequency of the electrodynamic actuator 1a, 1b or the output device 17. On the other hand, an airgap, which opens upon a movement of the movable magnetic circuit part 7 out of its idle position $P_0$, or ridges 19a, 19b vis-a-vis of the bottom plate 9 and the top plate 10 can be used to increase the resonant frequency of the electrodynamic actuator 1a, 1b or the output device 17. In other words, the acoustic characteristics of the electrodynamic actuator 1a, 1b or the output device 17 can be influenced by choosing an appropriate shape of the airgap.

Generally, a part of the total restoring force gradient $\Delta F_T / \Delta z$ caused by the magnet system 5 is at least 10% of the total restoring force gradient $\Delta F_T / \Delta z$ in the idle position $P_0$ of the movable magnetic circuit part 7. Additionally, a part of the total restoring force gradient $\Delta F_T / \Delta z$ caused by the magnet system 5 can be at least 10% of the total restoring force gradient $\Delta F_T / \Delta z$ in the maximum excursion position of the movable magnetic circuit part 7. The maximum excursion position of the movable magnetic circuit part 7 is the excursion, which occurs when the nominal current I of the electrodynamic actuator 1a, 1b or the output device 17 flows through the voice coils 4a, 4b at the resonance frequency of the electrodynamic actuator 1a, 1b. By the proposed measures, the magnet system 5 has a substantial influence on the total restoring force $F_T$ and on its gradient. Further preferred shares of the total restoring force gradient $\Delta F_T / \Delta z$ caused by the magnet system 5 are 30% or even 50%.

Figure 17:
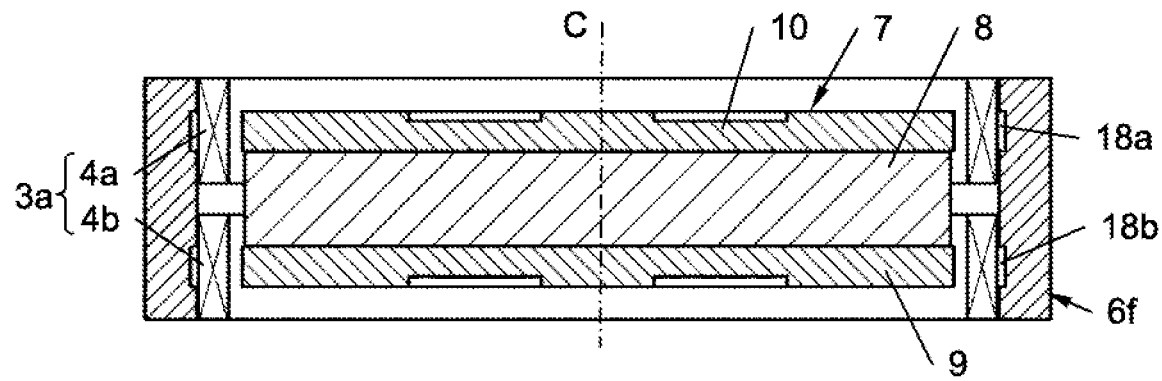
FIG. 17 shows an interior part of an electrodynamic actuator with an outer plate arrangement with flat grooves.
Figure 18:
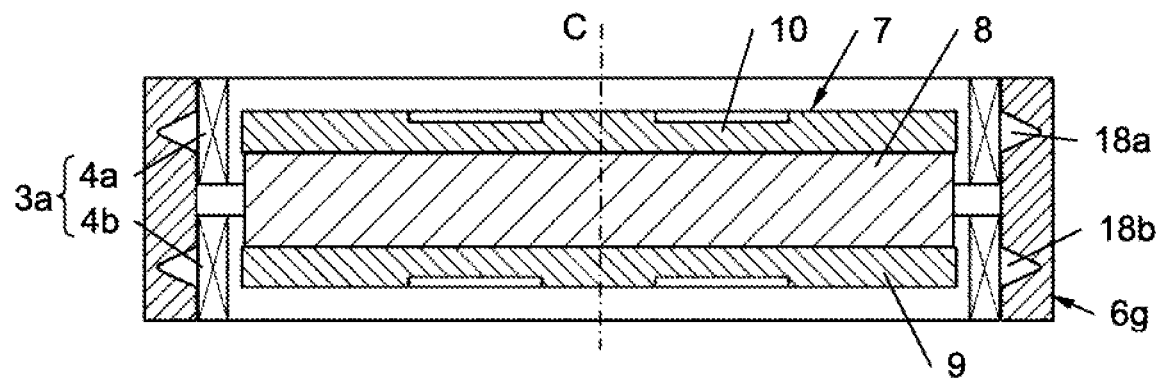
FIG. 18 shows an interior part of an electrodynamic actuator with an outer plate arrangement with deep triangular grooves.
Figure 19:
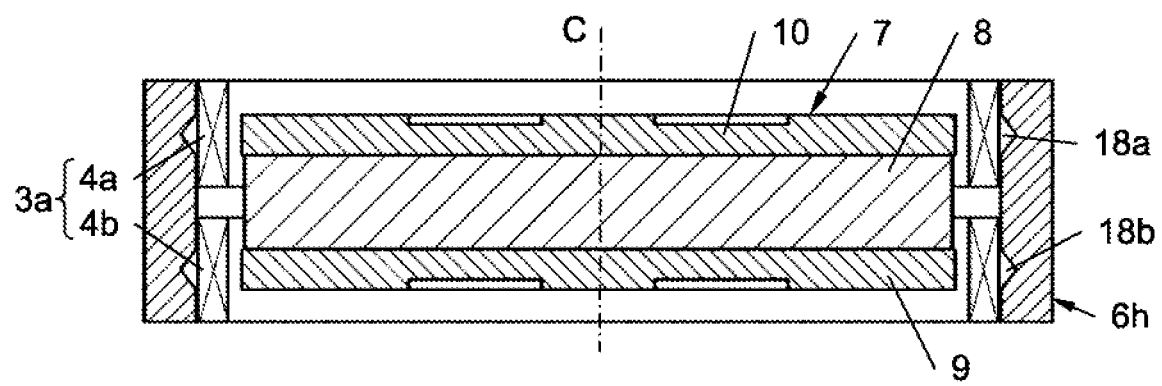
FIG. 19 shows an interior part of an electrodynamic actuator with an outer plate arrangement with flat triangular grooves.

FIGS. 17 to 19 show further examples of electrodynamic actuators with grooves 18a, 18b. In detail, FIG. 17 shows an interior part of an electrodynamic actuator with an outer plate arrangement 6f (static magnetic circuit part) with flat grooves 18a, 18b having a rectangular cross section. FIG. 18 shows an interior part of an electrodynamic actuator with an outer plate arrangement 6g with deep grooves 18a, 18b having a triangular cross section, and FIG. 19 shows an interior part of an electrodynamic actuator with an outer plate arrangement 6h with flat grooves 18a, 18b having a triangular cross section. It should be noted that the invention is not limited to the shape of grooves 18a, 18b shown in the Figures, but other shapes are possible as well. For example, the grooves 18a, 18b can have a trapezoid cross section or can also have a round shape like a semi-circle.

Figure 20:
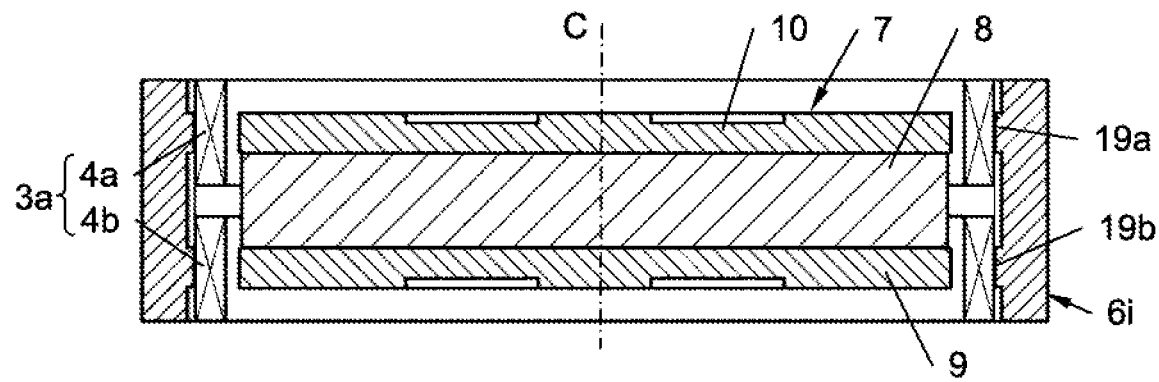
FIG. 20 shows an interior part of an electrodynamic actuator with an outer plate arrangement with flat rectangular ridges.
Figure 21:
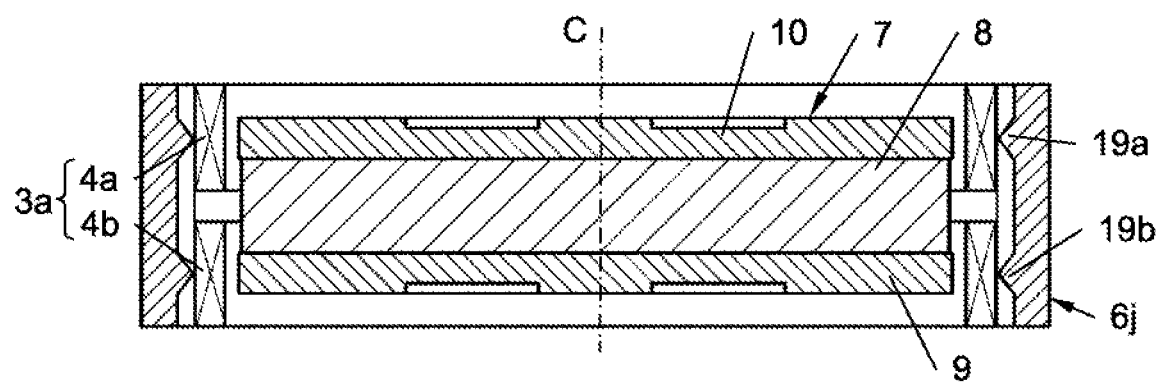
FIG. 21 shows an interior part of an electrodynamic actuator with an outer plate arrangement with triangular ridges.
Figure 22:
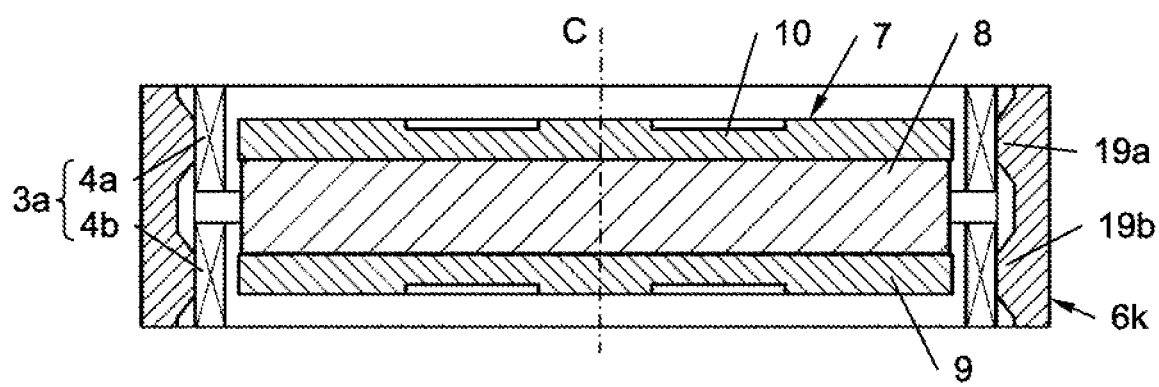
FIG. 22 shows an interior part of an electrodynamic actuator with an outer plate arrangement with trapezoid ridges.

FIGS. 20 to 22 show further examples of electrodynamic actuators with ridges 19a, 19b. In detail, FIG. 20 shows an interior part of an electrodynamic actuator with an outer plate arrangement 6i (static magnetic circuit part) with flat ridges 19a, 19b having a rectangular cross section. FIG. 21 shows an interior part of an electrodynamic actuator with an outer plate arrangement 6j with ridges 19a, 19b having a triangular cross section, and FIG. 22 shows an interior part of an electrodynamic actuator with an outer plate arrangement 6k with ridges 19a, 19b having a trapezoid cross section. It should be noted that the invention is not limited to the shape of ridges 19a, 19b shown in the Figures, but other shapes are possible as well. For example, the ridges 19a, 19b can also have a round shape like a semi-circle.

Figure 23:
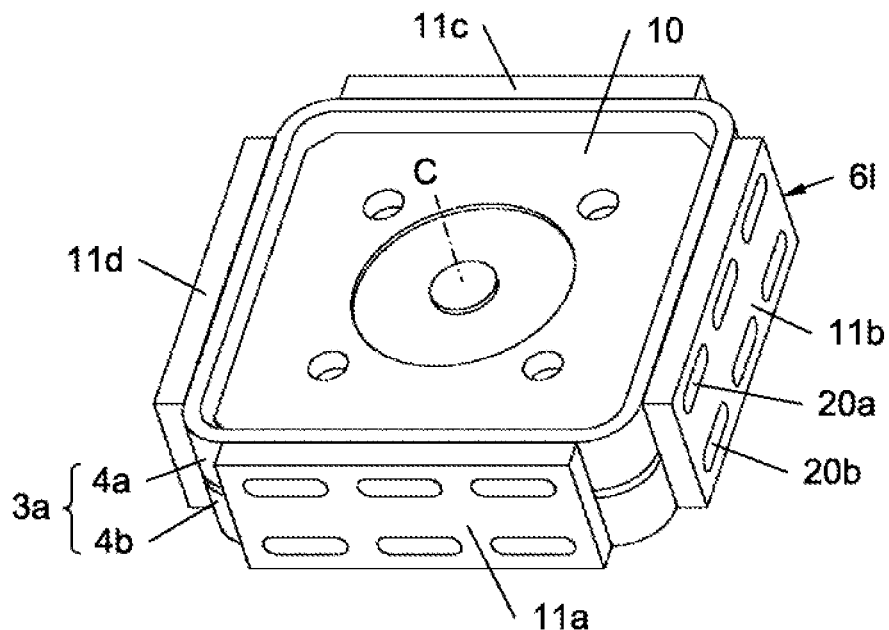
FIG. 23 shows an interior part of an electrodynamic actuator with slot holes in the outer plate arrangement.

FIG. 23 now shows an oblique view of an interior part of an electrodynamic actuator, which is similar to the interior part of the electrodynamic actuator 1a of FIGS. 1 to 3, but which has holes 20a, 20b in the outer plate arrangement 6l. The hole 20a faces the top plate 10 and the hole 20b faces the bottom plate 9. In this example, the holes 20a, 20b are slot through holes.

Figure 24:
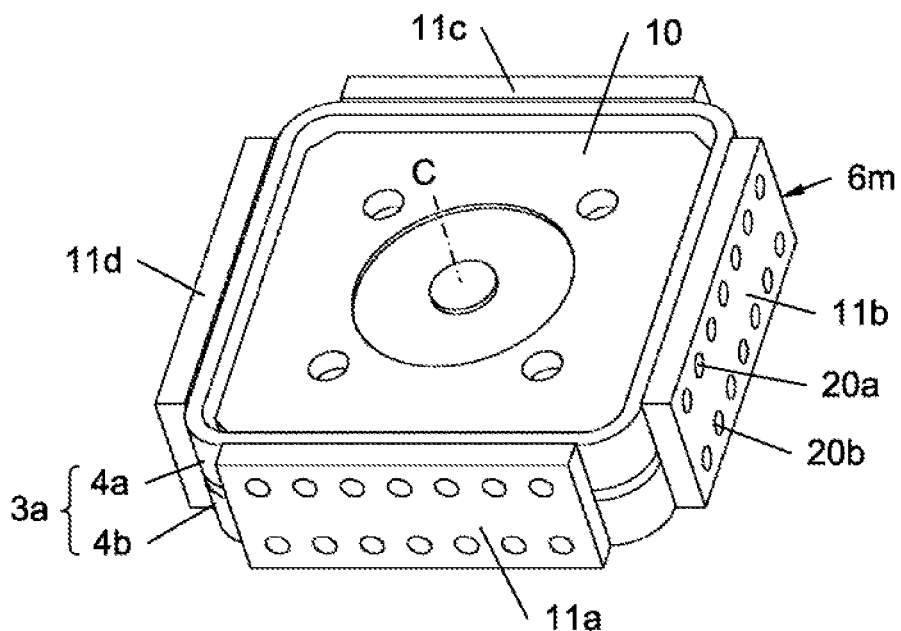
FIG. 24 shows an interior part of an electrodynamic actuator with circular holes in the outer plate arrangement.

However, this is not the only possibility, and the holes 20a, 20b may also be circular holes like this is the case for the embodiment shown in FIG. 24, which apart of the shape of the holes 20a, 20b is very similar to the embodiment shown in FIG. 23.

Figure 25:
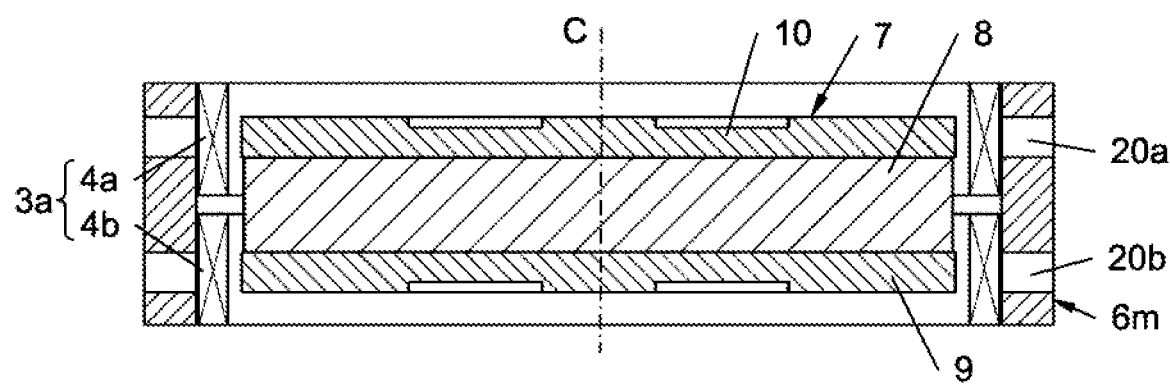

FIG. 25 in addition shows a cross sectional view of the interior part of the electrodynamic actuator shown in FIG. 24, but it is noted that it in principle also applies to the interior part of the electrodynamic actuator shown in FIG. 23. As is visible in FIG. 25, the holes 20a, 20b are through holes in this example. However, the holes 20a, 20b could also be designed as blind holes facing the top plate 10 and the bottom plate 9.

Figure 26:
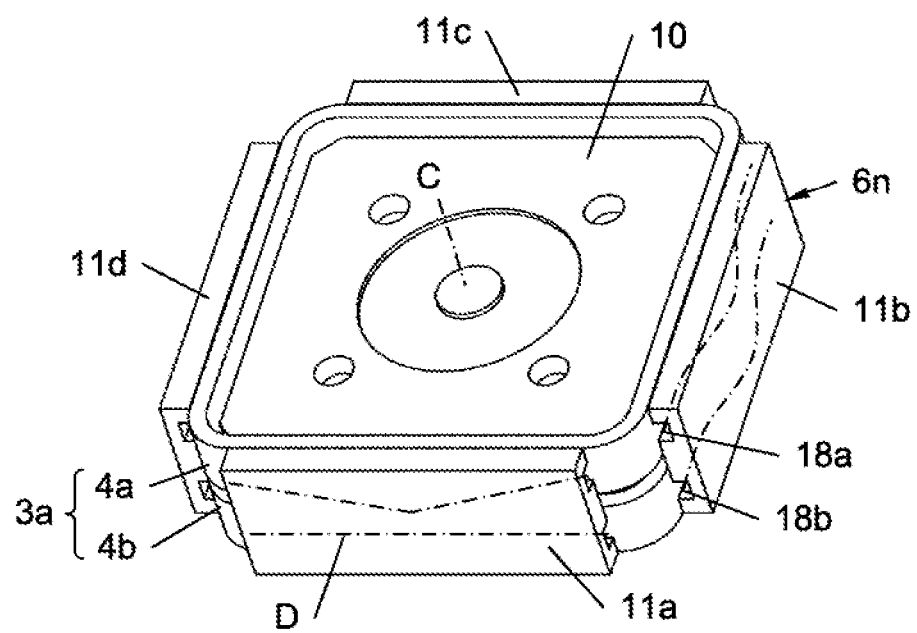
FIG. 26 shows an interior part of an electrodynamic actuator with a profile contour of the air gaps which varies or changes along its annular course.

Generally, a profile contour of an airgap between the static magnetic circuit part 6a . . . 6m and the movable magnetic circuit part 7 in cross sectional planes comprising the coil axis C can stay the same along an annular course of the airgap around the coil axis C. However, the profile contour of an airgap may also change or vary along an annular course of the airgap around the coil axis C like this is shown in FIG. 26 for the static magnetic circuit part 6n. Here, the groove axes D of the grooves 18a, 18b are not at the same height in z-direction, but the groove axes D may be general lines. This is another way to influence the course of the restoring force $F_M$ of the magnet system 5.

Figure 28:
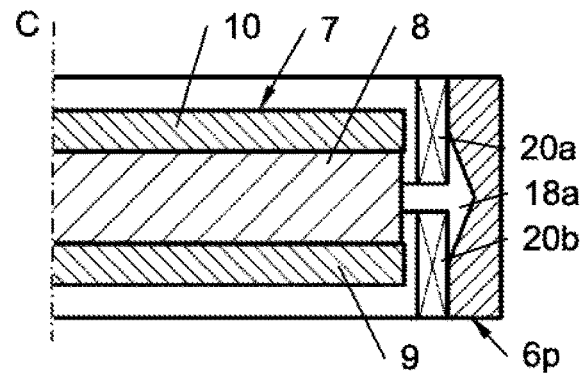
Figure 29:
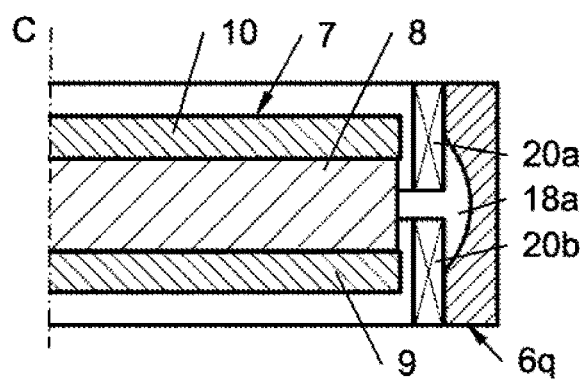
Figure 30:
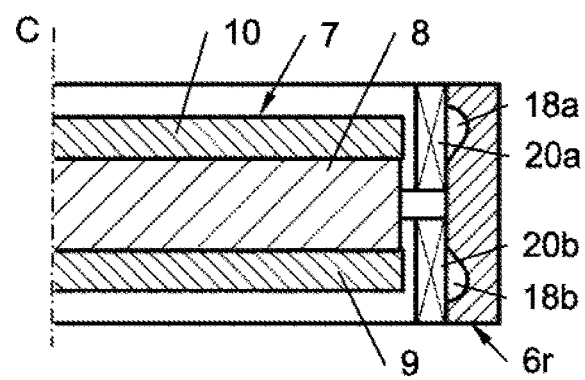
Figure 31:
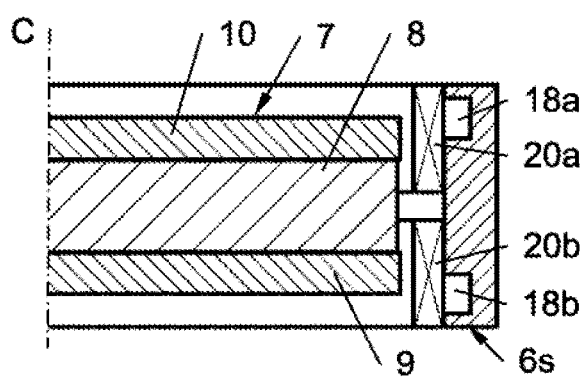
Figure 32:
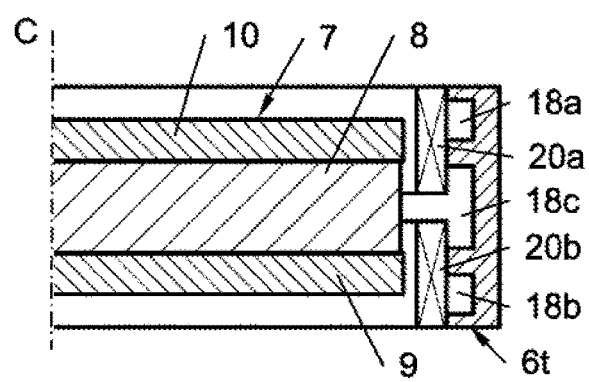
Figure 33:
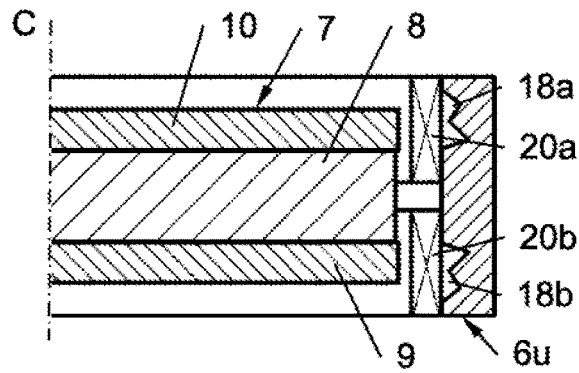
Figure 34:
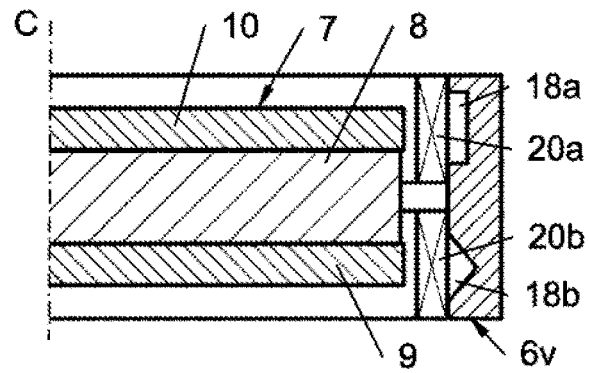
Figure 35:
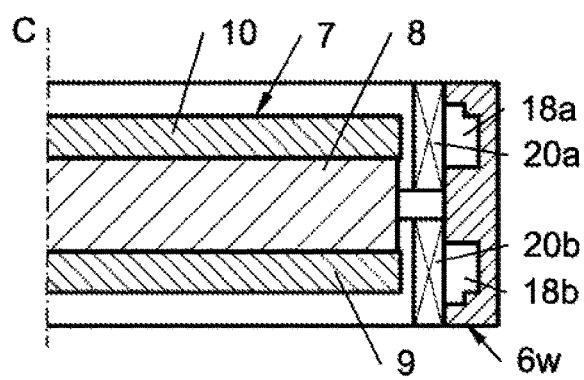
Figure 36:
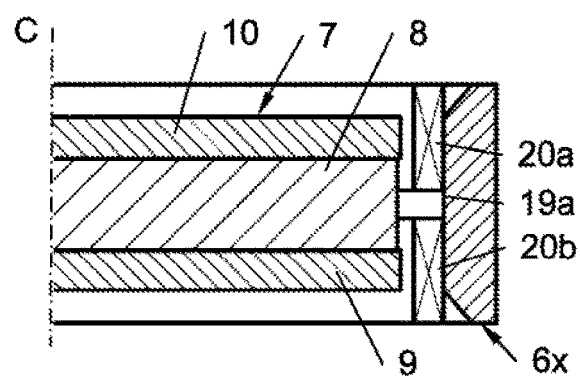
Figure 37:
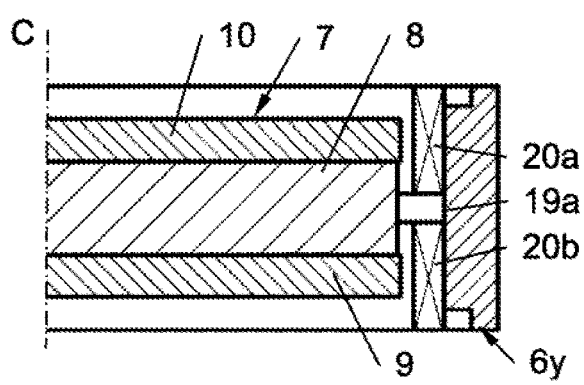
Figure 38:
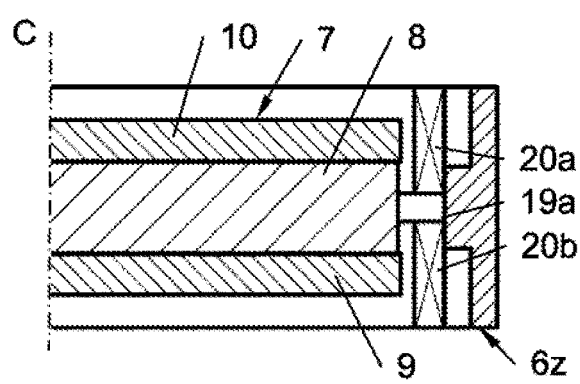
Figure 39:
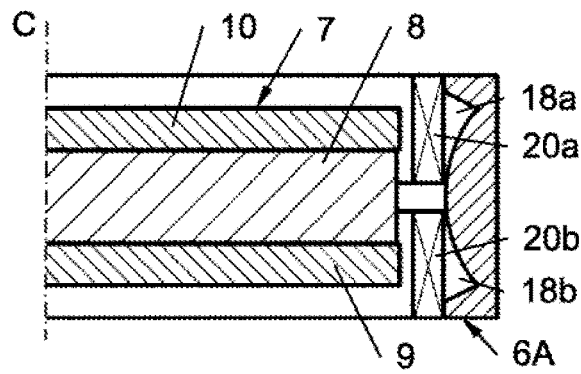
Figure 40:
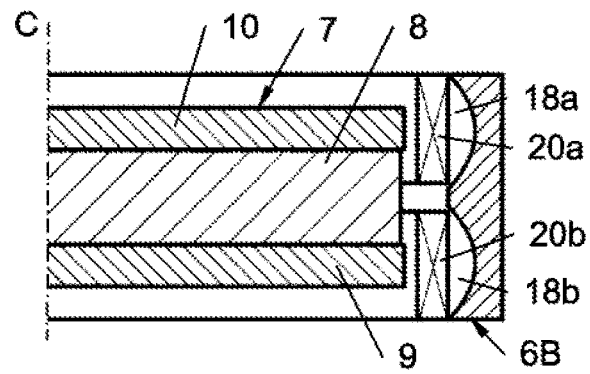
Figure 41:
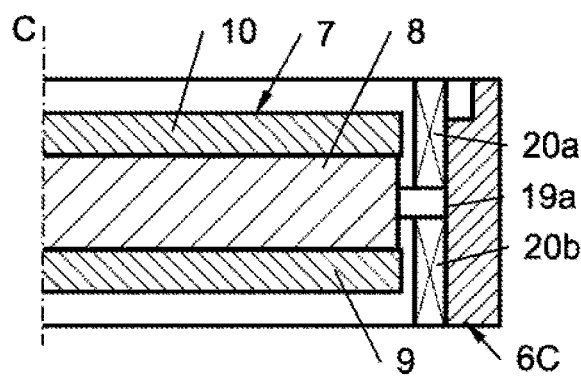
Figure 42:
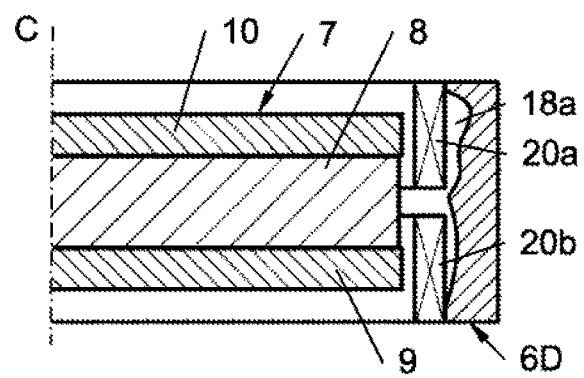
Figure 43:
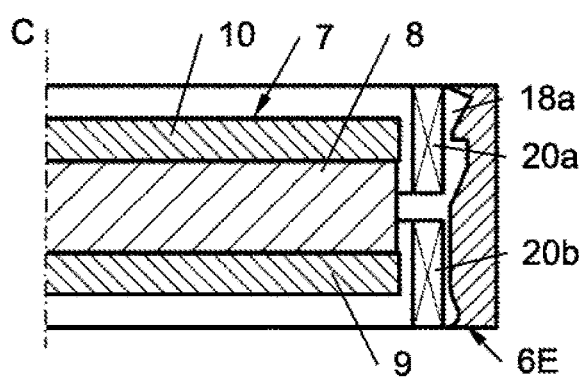
Figure 44:
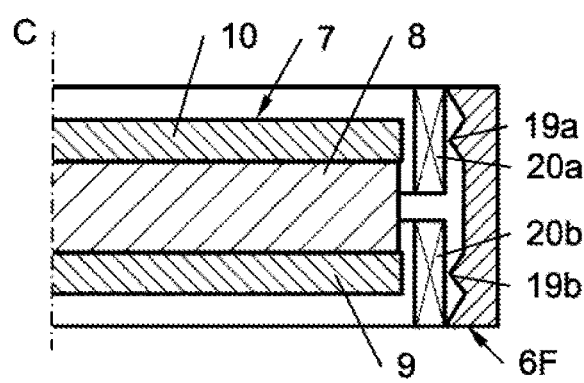

FIGS. 27 to 44 show various embodiments of interior parts of electrodynamic actuators in half section. The embodiment of FIG. 27 has an outer plate arrangement 6o with a single center groove 18a having a rectangular cross section. The embodiment of FIG. 28 has an outer plate arrangement 6p with a single center groove 18a having a triangular cross section. The embodiment of FIG. 29 has an outer plate arrangement 6q with a single center groove 18a having an arced cross section. The embodiment of FIG. 30 has an outer plate arrangement 6r with two grooves 18a, 18b facing the bottom plate 9 and the top plate 10 each having a cross section in the shape of half drops. The embodiment of FIG. 31 has an outer plate arrangement 6s with two grooves 18a, 18b facing the bottom plate 9 and the top plate 10 each having a rectangular cross section, wherein the grooves 18a, 18b are shifted outwards in relation to the bottom plate 9 and the top plate 10. FIG. 32 shows an embodiment, which is similar to the embodiment shown in FIG. 33. In contrast, the outer plate arrangement 6t comprises an additional center groove 18c with rectangular cross section. The embodiment of FIG. 33 has an outer plate arrangement 6u with two grooves 18a, 18b facing the bottom plate 9 and the top plate 10 each having a serrated cross section. The embodiment of FIG. 34 has an outer plate arrangement 6v with two grooves 18a, 18b facing the bottom plate 9 and the top plate 10, wherein the groove 18a facing top plate 10 has a rectangular cross section and the groove 18b facing bottom plate 9 has a triangular cross section. The embodiment of FIG. 35 has an outer plate arrangement 6w with two grooves 18a, 18b facing the bottom plate 9 and the top plate 10 each having a stepped cross section. The embodiment of FIG. 36 has an outer plate arrangement 6x with a chamfered ridge 19a. The embodiment of FIG. 37 has an outer plate arrangement 6x with a large stepped ridge 19a. The embodiment of FIG. 38 has an outer plate arrangement 6x with a small stepped ridge 19a. The embodiment of FIG. 39 has an outer plate arrangement 6A with two grooves 18a, 18b facing the bottom plate 9 and the top plate 10 each having a cross section in the shape of arced triangles. The embodiment of FIG. 40 has an outer plate arrangement 6B with two grooves 18a, 18b facing the bottom plate 9 and the top plate 10 each having an arced cross section. The embodiment of FIG. 41 has an outer plate arrangement 6C with a ridge 19a having a single upper step. The embodiments of FIGS. 42 and 43 have outer plate arrangements 6D, 6E with a single groove 18a having an irregular profile. And the embodiment of FIG. 44 has an outer plate arrangement 6F with two ridges 19a, 19b facing the bottom plate 9 and the top plate 10 each having a triangular cross section with adjacent upper and lower grooves with a triangular cross section and a center groove with a trapezoid cross section.

As is visible from the examples shown in the FIGS. 1 to 14, 17 to 33, 35 to 40 and FIG. 44, any profile of the outer plate arrangements 6a . . . 6u, 6w to 6B and 6F is symmetric with respect to an axis E perpendicular to the coil axis C at the idle position $P_0$ of the movable magnetic circuit part 7 there. But a profile may also be asymmetric with respect to such an axis E. Examples for asymmetric profiles of the outer plate arrangements 6v and 6C to 6E are shown in FIGS. 34 and 41 to 43.

Figure 27:
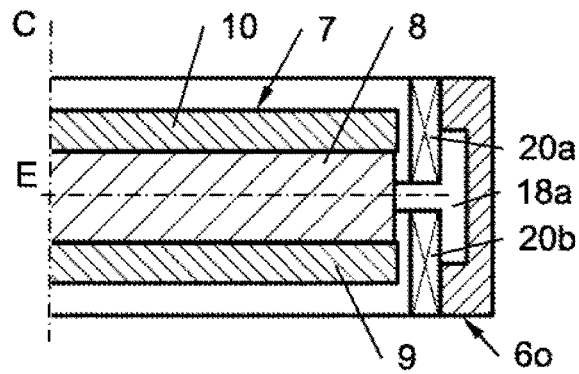
FIGS. 27 to 50 show various embodiments of interior parts of electrodynamic actuators in half section.

Note that this axis E is shown only in FIG. 27 for the sake of simplicity. However, one easily envisages that this line exists in the other embodiments as well.

In the examples of FIGS. 1 to 44, the focus was put on the profile contour of an airgap, which is situated in the static magnetic circuit part/outer plate arrangement 6a . . . 6F, although in principle the movable magnetic circuit part 7 comprises a shallow central groove being formed by the bottom plate 9 and the top plate 10, which slightly extend over the center magnet 8, forming a profile as well. Nevertheless, a profile in the movable magnetic circuit part 7 may also be more pronounced as this is shown in the examples of FIGS. 45 to 50.

Figure 45:
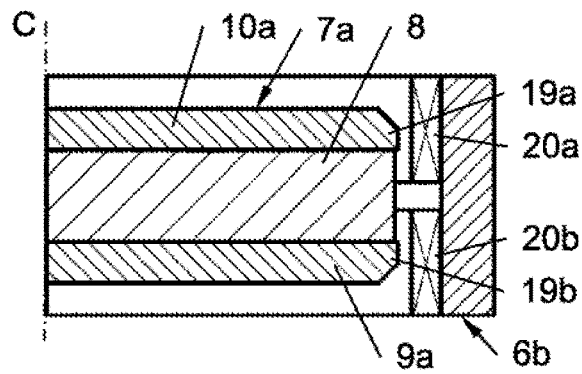
Figure 46:
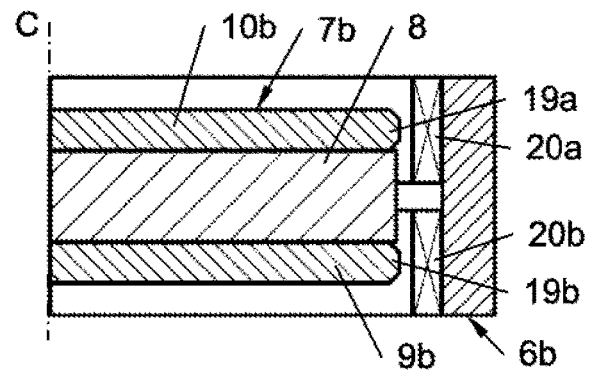
Figure 47:
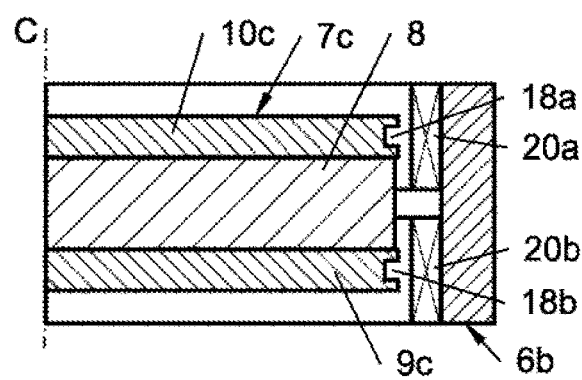
Figure 48:
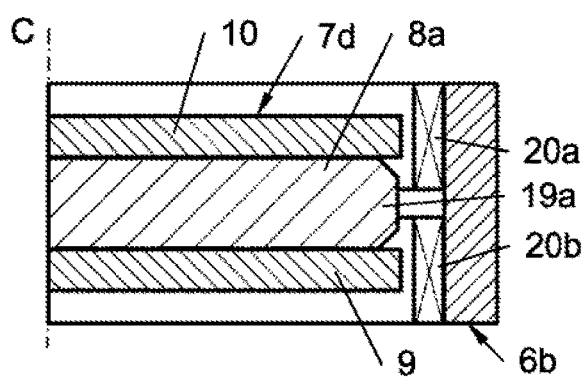
Figure 49:
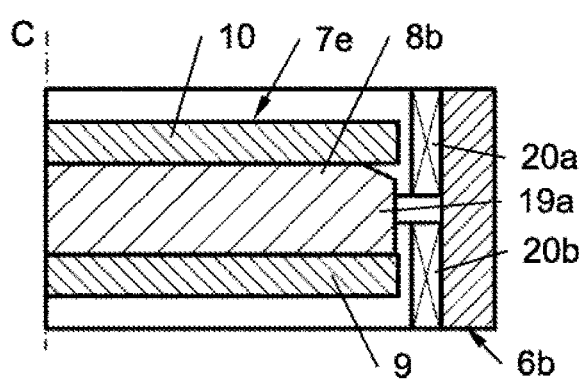
Figure 50:
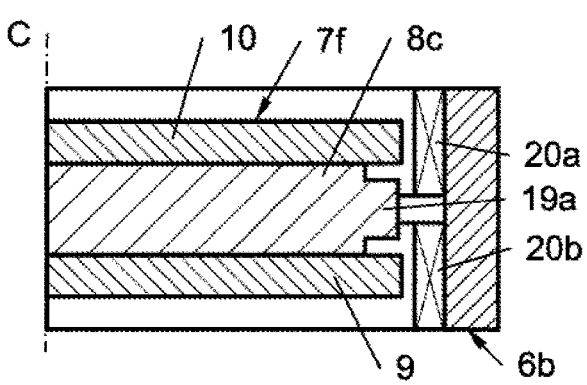

The embodiment of FIG. 45 has a movable magnetic circuit part 7a with ridges 19a, 19b on the bottom plate 9a and the top plate 10a which are formed by bottom and top chamfers and a small step facing the center magnet 8. The embodiment of FIG. 46 is similar to the embodiment of FIG. 45, but the bottom plate 9b and the top plate 10b of the movable magnetic circuit part 7b comprise chamfers on both sides. In the embodiment of FIG. 47, the bottom plate 9c and the top plate 10c of the movable magnetic circuit part 7c each comprises a groove 18a, 18b. In the embodiment of FIG. 48, the center magnet 8a of the movable magnetic circuit part 7d comprises chamfers on both sides thus forming a ridge 19a. The embodiment of FIG. 49 is similar to the embodiment of FIG. 48, but the center magnet 8b of the movable magnetic circuit part 7e comprises just a top chamfer thus forming a ridge 19a. And in the embodiment of FIG. 50, the center magnet 8c of the movable magnetic circuit part 7f comprises steps on both sides thus forming a ridge 19a.

So, alternatively or in addition to the profile contour of an airgap being situated in the static magnetic circuit part/outer plate arrangement 6a . . . 6F, also the movable magnetic circuit part 7, 7a . . . 7f may be profiled. In particular, the movable magnetic circuit part 7, 7a . . . 7f may comprise grooves 18a . . . 18c, ridges 19a, 19b, holes 19a, 19b or any other profile so as to influence the restoring force $F_M$ caused by the magnet system 5. It is also possible, that both the static magnetic circuit part 6a . . . 6F and the movable magnetic circuit part 7, 7a . . . 7f are profiled.

It is also possible that the static magnetic circuit part 6a . . . 6F and/or the movable magnetic circuit part 7, 7a . . . 7f comprises different profiles or different kind of profile influencing means. In other words, this in particular means that the static magnet circuit part 6a . . . 6F and/or the movable magnetic circuit part 7, 7a . . . 7f may comprise grooves 18a . . . 18c as well as ridges 19a, 19b as well as holes 19a, 19b.

It is also understandable from the Figs. that grooves 18a ... 18c and ridges 19a, 19b often appear in combination. A ridge 19a, 19b often has adjacent grooves 18a ... 18c and vice versa.

Figure 51:
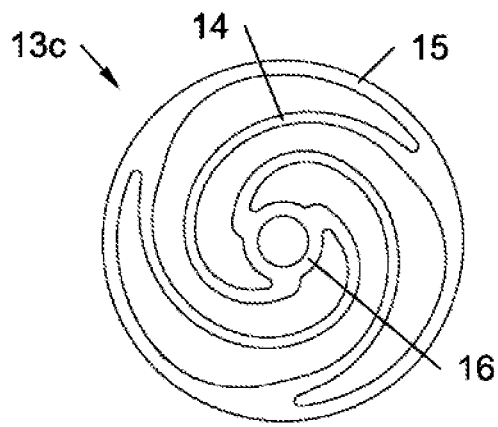
" and FIGS. 51 to 59 show various embodiments of springs in top view.
Figure 52:
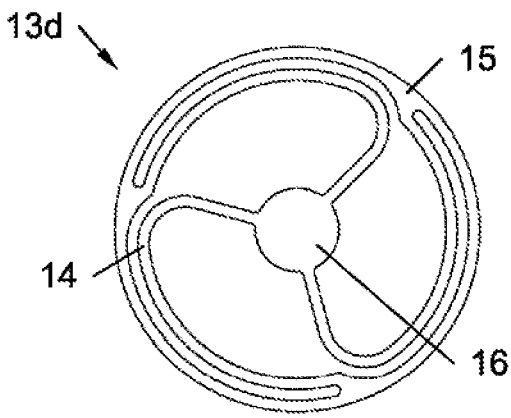
Figure 53:
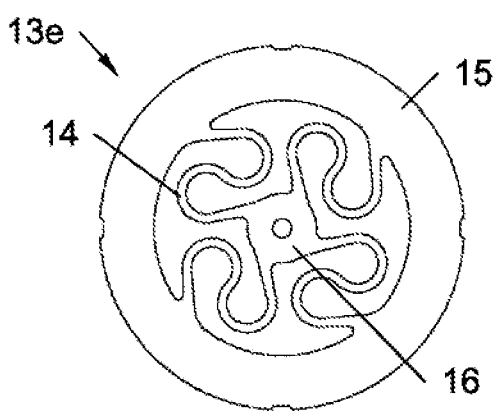
Figure 54:
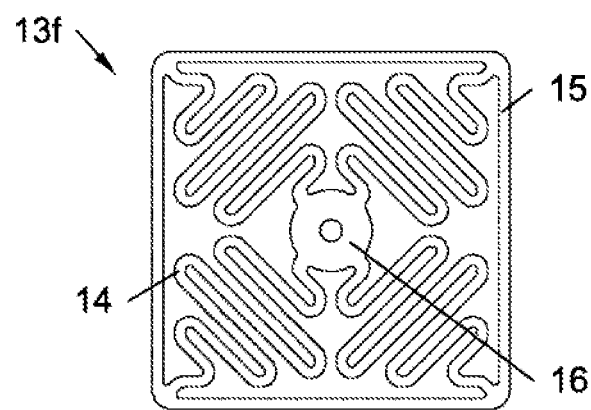
Figure 55:
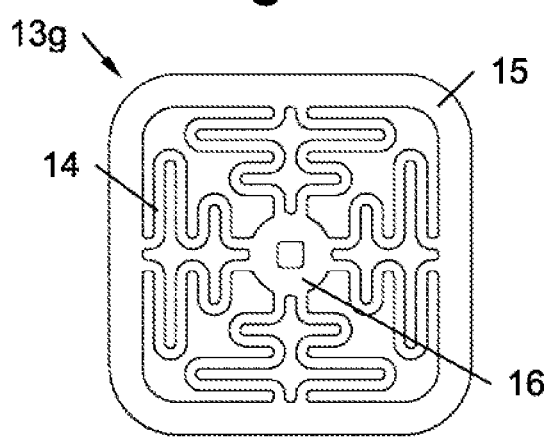
Figure 56:
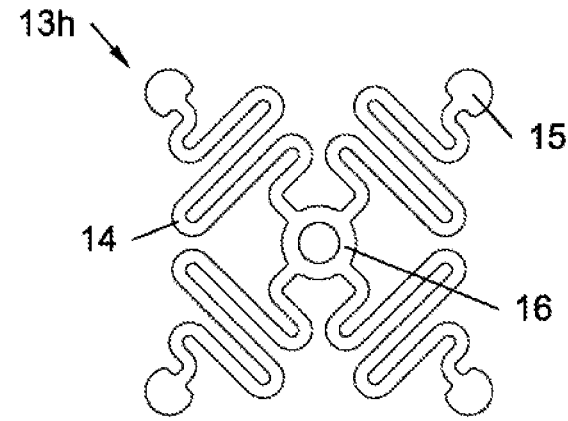
Figure 57:
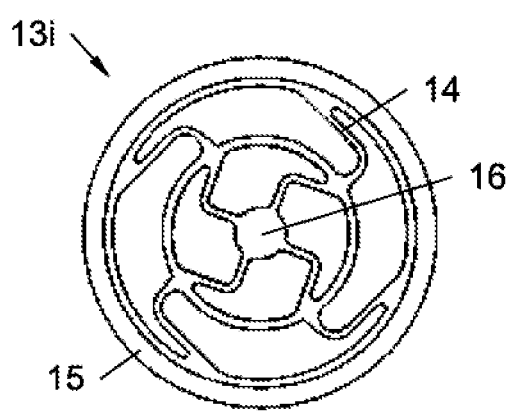
Figure 58:
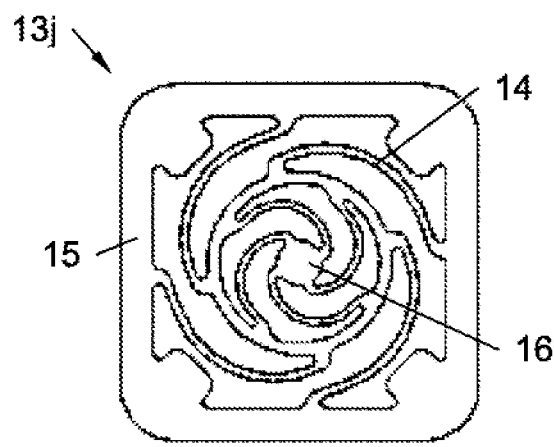
Figure 59:
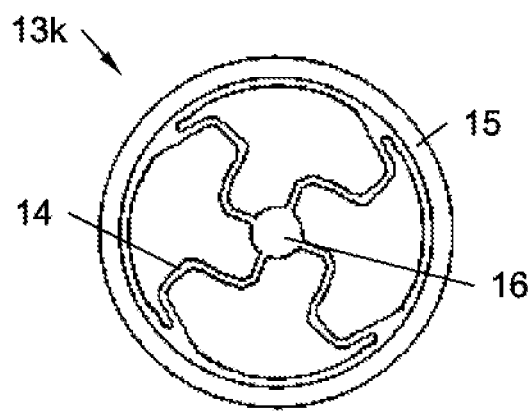

FIGS. 51 to 59 finally show various embodiments of springs 13c ... 13k, which can be used instead of the springs 13a, 13b in the embodiments of the electrodynamic actuators 1a, 1b disclosed hereinbefore. In detail, FIGS. 51 and 52 show springs 13c, 13d with exemplary alternative spiral spring legs 14. FIGS. 53 to 56 show various springs 13e ... 13h with spring legs 14, which are shaped like a meander in top view. In the embodiments of FIGS. 51 to 55 there are annular outer holders 15, whereas in the embodiment of FIG. 56 separate outer holders 15 on the end of each of the spring legs 14 are used. FIGS. 57 to 59 finally show various springs 13i ... 13k with spring legs 14, which change their winding direction. Accordingly, the springs 13i ... 13k can be seen as be made of two nested spiral springs each, which have opposite winding directions. Accordingly, a rotation between the outer holder 15 and the center holder 16 and thus between the movable magnetic circuit part 7, 7a ... 7f and the static magnetic circuit part 6a ... 6F upon an excursion of the movable magnetic circuit part 7, 7a ... 7f can be avoided or at least limited.

By the proposed measures, the total restoring force $F_T$ is substantially influenced by the magnet system 5. Accordingly, limitations of the spring arrangement 12 can be overcome or can be compensated. In total, the proposed solution offers more design freedom in terms of reaching a desired output power, a desired sound quality and a desired lifetime for the electromagnetic actuator 1a, 1b and the output device 17.

Finally, one should note that the invention is not limited to the above-mentioned embodiments and exemplary working examples. Further developments, modifications and combinations are also within the scope of the patent claims and are placed in the possession of the person skilled in the art from the above disclosure. Accordingly, the techniques and structures described and illustrated herein should be understood to be illustrative and exemplary, and not limiting upon the scope of the present invention. The scope of the present invention is defined by the appended claims, including known equivalents and unforeseeable equivalents at the time of filing of this application. Although numerous embodiments of this invention have been described above with a certain degree of particularity, those skilled in the art could make numerous alterations to the disclosed embodiments without departing from the spirit or scope of this disclosure.

LIST OF REFERENCES 1a, 1b electromagnetic actuator
2 plate like structure (e.g. display)
3a, 3b (annular) coil arrangement
4a, 4b voice coil
5 magnet system
6a ... 6F static magnetic circuit part/outer plate arrangement
7, 7a ... 7f movable magnetic circuit part
8, 8a ... 8c center magnet
9, 9a ... 9c bottom plate
10, 10a ... 10c top plate
11, 11a ... 11d outer plate
12 spring arrangement
13a ... 13k spring
14 spring leg
15 (annular) outer holder
16 center holder
17 output device
18a ... 18c groove
19a, 19b ridge
19a, 19b hole
b airgap width
B1, B2 magnetic field
C coil axis (actuator axis)
D groove axis
d voice coil width
E axis through idle position
F force
$F_M$ restoring force caused by magnet system
$F_S$ restoring force caused by spring arrangement
$F_T$ total restoring force
$\Delta F_T$ differential total restoring force
$\Delta F_T/\Delta z$ total restoring force gradient
I current
M magnetic flux
$P_0$ idle position
S (main) sound emanating surface
z excursion
$\Delta z$ differential excursion

What is claimed is:

1. An electrodynamic actuator (1a, 1b), which is designed to be connected to a backside of a plate like structure (2) opposite to a sound emanating surface (S) of the plate like structure (2), and which comprises:
   a coil arrangement (3a, 3b) with at least one voice coil (4a, 4b), which has an electrical conductor in the shape of loops running around a coil axis (C) in a loop section;
   a magnet system (5), comprising a static magnetic circuit part (6a ... 6F), which is arranged in fixed relation to the coil arrangement (3a, 3b), and a movable magnetic circuit part (7, 7a ... 7f), wherein the magnet system (5) is designed to generate a magnetic field (B1, B2) transverse to the conductor in the loop section; and
   a spring arrangement (12) coupling the static magnetic circuit part (6a ... 6F) to the movable magnetic circuit part (7, 7a ... 7f) and allowing a relative movement between the static magnetic circuit part (6a ... 6F) and said movable magnetic circuit part (7, 7a ... 7f) in an excursion direction (z) parallel to the coil axis (C),
   wherein both the spring arrangement (12) and the magnet system (5) provide a total restoring force ($F_T$) directed towards an idle position ($P_0$) of the movable magnetic circuit part (7, 7a ... 7f), which idle position ($P_0$) is defined as the position of the movable magnetic circuit part (7, 7a ... 7f) when no current (I) flows through the at least one voice coil (4a, 4b),
   wherein a ratio between a differential total restoring force ($\Delta F_T$) and a differential excursion ($\Delta z$) of the movable magnetic circuit part (7, 7a ... 7f) is defined as a total restoring force gradient ($\Delta F_T/\Delta z$), and
   wherein a part of the total restoring force gradient ($\Delta F_T/\Delta z$) caused by the magnet system (5) is at least 10% of the total restoring force gradient ($\Delta F_T/\Delta z$) in said idle position ($P_0$) of the movable magnetic circuit part (7, 7a ... 7f).

2. The electrodynamic actuator (1a, 1b) as claimed in claim 1, wherein a part of the total restoring force gradient ($\Delta F_T/\Delta z$) caused by the magnet system (5) is at least 10% of the total restoring force gradient ($\Delta F_T/\Delta z$) in the maximum excursion position of the movable magnetic circuit part (7, 7a ... 7f).

3. The electrodynamic actuator (1a, 1b) as claimed in claim 1, wherein the part of the total restoring force gradient ($\Delta F_T/\Delta z$) caused by the magnet system (5) in said idle position ($P_0$) of the movable magnetic circuit part (7, 7a . . . 7f) is smaller than in a position of the movable magnetic circuit part (7, 7a . . . 7f) displaced from said idle position ($P_0$).

4. The electrodynamic actuator (1a, 1b) as claimed in claim 1, wherein the part of the total restoring force gradient ($\Delta F_T/\Delta z$) caused by the magnet system (5) in said idle position ($P_0$) of the movable magnetic circuit part (7, 7a . . . 7f) is higher than in a position of the movable magnetic circuit part (7, 7a . . . 7f) displaced from said idle position ($P_0$).

5. The electrodynamic actuator (1a, 1b) as claimed in claim 1, wherein a width (b) of an airgap between the static magnetic circuit part (6a . . . 6F) and the movable magnetic circuit part (7, 7a . . . 7f) in a cross sectional plane comprising the coil axis (C) measured in a direction perpendicular to said coil axis (C) is constant along a direction parallel to said coil axis (C).

6. The electrodynamic actuator (1a, 1b) as claimed in claim 1, wherein a width (b) of an airgap between the static magnetic circuit part (6a . . . 6F) and the movable magnetic circuit part (7, 7a . . . 7f) in a cross sectional plane comprising the coil axis (C) measured in a direction perpendicular to said coil axis (C) changes or varies along a direction parallel to said coil axis (C).

7. The electrodynamic actuator (1a, 1b) as claimed in claim 1, wherein a profile contour of an airgap between the static magnetic circuit part (6a . . . 6F) and the movable magnetic circuit part (7, 7a . . . 7f) in a cross sectional plane comprising the coil axis (C) changes stepwise in a direction parallel to said coil axis (C).

8. The electrodynamic actuator (1a, 1b) as claimed in claim 1, wherein a profile contour of an airgap between the static magnetic circuit part (6a . . . 6F) and the movable magnetic circuit part (7, 7a . . . 7f) in a cross sectional plane comprising the coil axis (C) changes continuously in a direction parallel to said coil axis (C).

9. The electrodynamic actuator (1a, 1b) as claimed in claim 1, wherein a profile contour of an airgap between the static magnetic circuit part (6a . . . 6F) and the movable magnetic circuit part (7, 7a . . . 7f) in cross sectional planes comprising the coil axis (C) stays the same along an annular course of the airgap around the coil axis (C).

10. The electrodynamic actuator (1a, 1b) as claimed in claim 1, wherein a profile contour of an airgap between the static magnetic circuit part (6a . . . 6F) and the movable magnetic circuit part (7, 7a . . . 7f) in cross sectional planes comprising the coil axis (C) changes or varies along an annular course of the airgap around the coil axis (C).

11. The electrodynamic actuator (1a, 1b) as claimed in claim 1, wherein a width (d) of the at least one voice coil (4a, 4b) in a cross sectional plane comprising the coil axis (C) measured in a direction perpendicular to said coil axis (C) is constant along a direction parallel to said coil axis (C).

12. The electrodynamic actuator (1a, 1b) as claimed in claim 1, wherein a width (d) of the at least one voice coil (4a, 4b) in a cross sectional plane comprising the coil axis (C) measured in a direction perpendicular to said coil axis (C) changes or varies along a direction parallel to said coil axis (C).

13. The electrodynamic actuator (1a, 1b) as claimed in claim 1, wherein a profile contour of the at least one voice coil (4a, 4b) in a cross sectional plane comprising the coil axis (C) changes stepwise in a direction parallel to said coil axis (C).

14. The electrodynamic actuator (1a, 1b) as claimed in claim 1, wherein a profile contour of the at least one voice coil (4a, 4b) in a cross sectional plane comprising the coil axis (C) changes continuously in a direction parallel to said coil axis (C).

15. The electrodynamic actuator (1a, 1b) as claimed in claim 1, wherein the magnet system (5) comprises a center magnet (8, 8a . . . 8c), a bottom plate (9, 9a . . . 9c) arranged adjacent to said center magnet (8, 8a . . . 8c), a top plate (10, 10a . . . 10c) arranged adjacent to said center magnet (8, 8a . . . 8c) and opposite of the bottom plate (9, 9a . . . 9c) and an outer plate arrangement (6a . . . 6F) surrounding the top plate (10, 10a . . . 10c), wherein the outer plate arrangement (6a . . . 6F) comprises a groove (18a, 18b) facing the top plate (10, 10a . . . 10c).

16. The electrodynamic actuator (1a, 1b) as claimed in claim 1, wherein the magnet system (5) comprises a center magnet (8, 8a . . . 8c), a bottom plate (9, 9a . . . 9c) arranged adjacent to said center magnet (8, 8a . . . 8c), a top plate (10, 10a . . . 10c) arranged adjacent to said center magnet (8, 8a . . . 8c) and opposite of the bottom plate (9, 9a . . . 9c) and an outer plate arrangement (6a . . . 6F) surrounding the top plate (10, 10a . . . 10c), wherein the outer plate arrangement (6a . . . 6F) comprises a ridge (19a, 19b) facing the top plate (10, 10a . . . 10c).

17. The electrodynamic actuator (1a, 1b) as claimed in claim 1, wherein the magnet system (5) comprises a center magnet (8, 8a . . . 8c), a bottom plate (9, 9a . . . 9c) arranged adjacent to said center magnet (8, 8a . . . 8c), a top plate (10, 10a . . . 10c) arranged adjacent to said center magnet (8, 8a . . . 8c) and opposite of the bottom plate (9, 9a . . . 9c) and an outer plate arrangement (6a . . . 6F) surrounding the top plate (10, 10a . . . 10c), wherein the outer plate arrangement (6a . . . 6F) comprises holes (20a, 20b) facing the top plate (10, 10a . . . 10c).

18. The electrodynamic actuator (1a, 1b) as claimed in claim 1, wherein the magnet system (5) comprises a center magnet (8, 8a . . . 8c), a bottom plate (9, 9a . . . 9c) arranged adjacent to said center magnet (8, 8a . . . 8c), a top plate (10, 10a . . . 10c) arranged adjacent to said center magnet (8, 8a . . . 8c) and opposite of the bottom plate (9, 9a . . . 9c) and an outer plate arrangement (6a . . . 6F) surrounding the top plate (10, 10a . . . 10c), wherein an airgap between the top plate (10, 10a . . . 10c) and the outer plate arrangement (6a . . . 6F) is larger than besides thereof.

19. The electrodynamic actuator (1a, 1b) as claimed in claim 1, wherein the magnet system (5) comprises a center magnet (8, 8a . . . 8c), a bottom plate (9, 9a . . . 9c) arranged adjacent to said center magnet (8, 8a . . . 8c), a top plate (10, 10a . . . 10c) arranged adjacent to said center magnet (8, 8a . . . 8c) and opposite of the bottom plate (9, 9a . . . 9c) and an outer plate arrangement (6a . . . 6F) surrounding the top plate (10, 10a . . . 10c), wherein an airgap between the top plate (10, 10a . . . 10c) and the outer plate arrangement (6a . . . 6F) is smaller than besides thereof.

20. The electrodynamic actuator (1a, 1b) as claimed in claim 1, wherein a profile contour of an airgap between the static magnetic circuit part (6a . . . 6F) and the movable magnetic circuit part (7, 7a . . . 7f) in a cross sectional plane comprising the coil axis (C) is symmetric with respect to an axis (E) perpendicular to the coil axis (C) at the idle position ($P_0$) of the movable magnetic circuit part (7, 7a . . . 7f).

21. The electrodynamic actuator (1a, 1b) as claimed in claim 1, wherein a profile contour of an airgap between the static magnetic circuit part (6*a* . . . 6F) and the movable magnetic circuit part (7, 7*a* . . . 7*f*) in a cross sectional plane comprising the coil axis (C) is asymmetric with respect to an axis (E) perpendicular to the coil axis (C) at the idle position ($P_0$) of the movable magnetic circuit part (7, 7*a* . . . 7*f*).

22. An output device (17), comprising a plate like structure (2) with a sound emanating surface (S) and a backside opposite to the sound emanating surface (S) and comprising an electromagnetic actuator (1*a*, 1*b*) connected to said backside, characterized in that the electromagnetic actuator (1*a*, 1*b*) is designed according to claim 1.

23. The output device (17) as claimed in claim 22 characterized in that the plate like structure (2) is embodied as a display and that the electromagnetic actuator (1*a*, 1*b*) is connected to the backside of the display.

24. The output device (17) as claimed in claim 22 characterized in that an average sound pressure level of the output device (17) measured in an orthogonal distance of 10 cm from the sound emanating surface (S) is at least 50 dB_SPL in a frequency range from 100 Hz to 15 kHz.

\* \* \* \* \*